United States Patent
Yamkovoy

(10) Patent No.: US 8,494,184 B2
(45) Date of Patent: *Jul. 23, 2013

(54) DIGITAL DATA TRANSFER VIA AUDIO SIGNAL CONDUCTORS

(75) Inventor: Paul G. Yamkovoy, Acton, MA (US)

(73) Assignee: Bose Corporation, Framingham, MA (US)

( * ) Notice: Subject to any disclaimer, the term of this patent is extended or adjusted under 35 U.S.C. 154(b) by 341 days.

This patent is subject to a terminal disclaimer.

(21) Appl. No.: 12/838,464

(22) Filed: Jul. 18, 2010

(65) Prior Publication Data

US 2012/0014531 A1   Jan. 19, 2012

(51) Int. Cl.
H04R 25/00 (2006.01)
(52) U.S. Cl.
USPC ........... 381/150; 381/374; 381/120; 379/430; 455/575.2; 330/11
(58) Field of Classification Search
USPC ............. 381/58, 59, 120, 119, 150, 400, 396, 381/111, 370, 375, 374, 182, 74; 379/430, 379/428.01; 455/575.2; 330/11, 138, 135, 330/129, 127
See application file for complete search history.

(56) References Cited

U.S. PATENT DOCUMENTS

| 5,133,006 | A | 7/1992 | Khuat |
| 6,859,538 | B1 | 2/2005 | Voltz |
| 7,031,476 | B1 | 4/2006 | Chrisop et al. |
| 2002/0097883 | A1 | 7/2002 | Foley |
| 2004/0157555 | A1* | 8/2004 | Richenstein et al. ........... 455/39 |
| 2006/0147062 | A1* | 7/2006 | Niwa et al. .................. 381/113 |
| 2006/0215856 | A1 | 9/2006 | Meyer et al. |
| 2007/0035407 | A1 | 2/2007 | Capowski et al. |
| 2010/0122005 | A1 | 5/2010 | Kong et al. |
| 2011/0110536 | A1* | 5/2011 | Hovesten et al. ............. 381/111 |
| 2011/0164754 | A1 | 7/2011 | Gleissner et al. |

FOREIGN PATENT DOCUMENTS

| EP | 1156587 A2 | 11/2001 |
| GB | 2123193 A | 1/1984 |
| WO | 9629779 A2 | 9/1996 |
| WO | 2006032645 A1 | 3/2006 |

OTHER PUBLICATIONS

International Search Report and Written Opinion dated Oct. 5, 2011 for International Application No. PCT/US2011/044311.
Invitation to Pay Additional Fees dated Oct. 12, 2011 for International Application No. PCT/US2011/044331.
International Search Report and Written Opinion dated Dec. 1, 2011 for International Application No. PCT/US2011/044331.

(Continued)

*Primary Examiner* — Vivian Chin
*Assistant Examiner* — Con P Tran
(74) *Attorney, Agent, or Firm* — Bose Corporation

(57) ABSTRACT

An electro-acoustic transducer or a device into which an electro-acoustic transducer is incorporated has at least two audio signal conductors through which the electro-acoustic transducer or device may be coupled to another device to convey analog audio signals representing sounds at a time when the other device places a relatively low DC bias voltage across the at least two audio signal conductors, and to be operated as a digital serial bus to exchange pieces of digitally-encoded data concerning the electro-acoustic transducer at a time when the other device places a relatively high DC bias voltage across the at least two audio signal conductors.

24 Claims, 10 Drawing Sheets

OTHER PUBLICATIONS

International Preliminary Report on Patentability dated Jan. 31, 2013 for International Application No. PCT/US2011/044331.

International Preliminary Report on Patentability dated Jan. 31, 2013 for International Application No. PCT/US2011/044311.

* cited by examiner

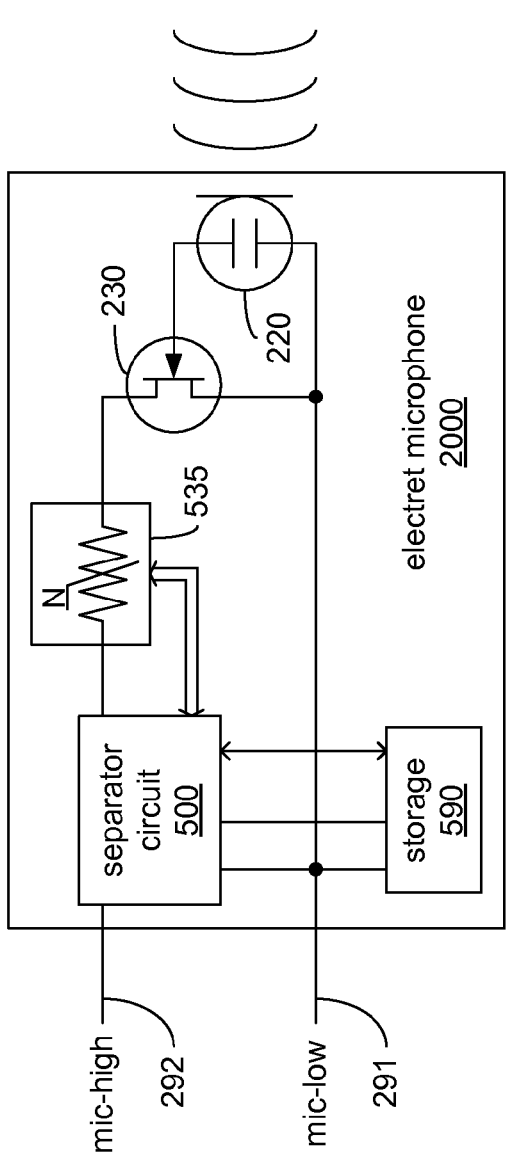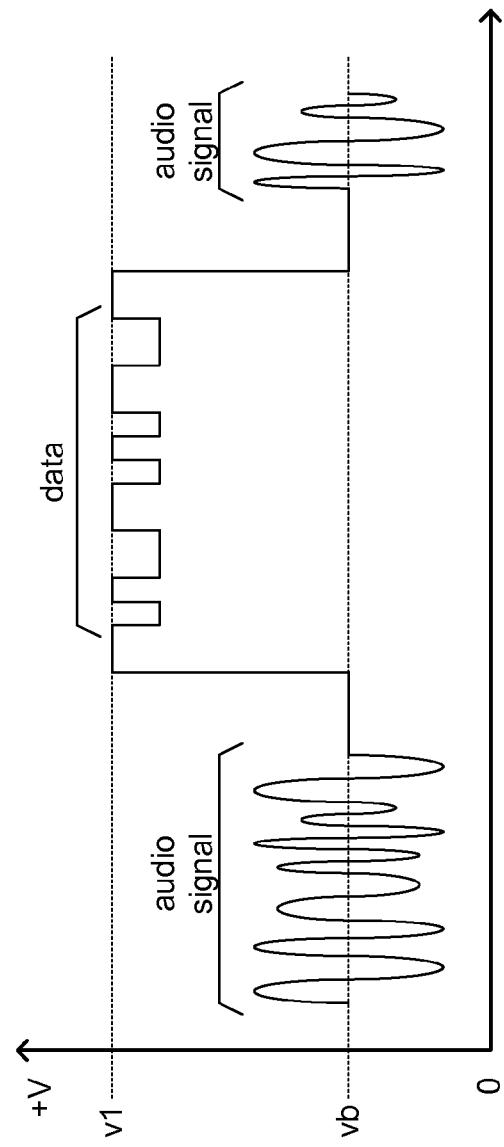
FIG. 2a
FIG. 2b

DIGITAL DATA TRANSFER VIA AUDIO SIGNAL CONDUCTORS

TECHNICAL FIELD

This disclosure relates to devices incorporating electro-acoustic transducers (e.g., microphones and acoustic drivers), and devices that are able to be coupled to other devices through audio signal conductors to exchange analog audio signals.

BACKGROUND

Electro-acoustic transducers and devices that incorporate them are becoming ever more widely used at an ever increasing rate. Technological advances have increased the amount of voice, video, music and other audio-visual material that can be stored within both portable and stationary devices; have increased the fidelity with which voice and video are able to be conveyed between persons in two-way communications; have increased the effectiveness with which active noise reduction (ANR) capabilities can be provided by a portable device; and have increased the flexibility that can be provided to end users to manipulate audio-visual material as it is played. As a result, not only has the quantity of devices incorporating electro-acoustic transducers dramatically increased, but so has the expectations of end-users regarding the quality of those devices.

By way of example, not just the quantity of personal digital audio players has increased, but also end user expectations of being able to hear the audio played by these devices with a fuller range of frequencies and greater clarity, even when listening with what might otherwise be viewed as a "simple" pair of headphones. By way of another example, not just the quantity of home theatre systems capable of providing a sought-after "movie like" experience has increased, but also user expectations of the quality of the audible illusion of "being there" in the scenery displayed on a screen as provided by an ever increasing quantity and types of acoustic drivers positioned around an end user's listening space. By way of yet another example, not just the quantity of personal ANR headsets has increased, but also user expectations of the completeness of the noise reduction effect to enable them to "shut out" (i.e., attenuate) unwanted sounds in their environment.

With this fast developing situation, overcoming inevitable variances in the characteristics of electro-acoustic transducers, from one to another of any given manufacturing run and from sought-after ideal characteristics, is becoming ever more important. A longstanding practice to accommodate such variances has been testing a specific electro-acoustic transducer to discern its characteristics, and then tuning a gain control component within a device to compensate for how those characteristics differ from sought-after ideal characteristics. Taking this step in the manufacture of such a device may successfully bring the resulting behavior of that electro-acoustic transducer closer to a sought-after ideal, but the effectiveness of this step can later be entirely undermined where that electro-acoustic transducer or that previously tuned gain control component is replaced such that there ceases to be such a match between an electro-acoustic transducer and a gain control component.

Correcting this later introduction of such a mismatch between an electro-acoustic transducer and the tuning of a gain control component usually involves bringing the device to a location at which appropriately trained personnel with access to appropriate equipment are able to perform the same type of testing of the electro-acoustic transducer and tuning of the gain control component that was originally done as part of the manufacture of the device to create a new such match. Alternatively, where it is the electro-acoustic transducer that is being replaced, correcting such a later occurring mismatch could involve testing a multitude of candidate replacement electro-acoustic transducers in the hope of finding one having characteristics close enough to the one being replaced that another tuning of a gain control component is rendered unnecessary.

SUMMARY

A device into which an electro-acoustic transducer is incorporated has at least two audio signal conductors through which the device may be coupled to another device to convey analog audio signals representing sounds at a time when the other device places a relatively low DC bias voltage across the at least two audio signal conductors, and to be operated as either a digital serial bus to exchange pieces of digitally-encoded data concerning the electro-acoustic transducer or as a trigger to cause the electro-acoustic transducer to be bypassed to enable another electro-acoustic transducer to be tested at a time when the other device places a relatively high DC bias voltage across the at least two audio signal conductors. An electro-acoustic transducer or a device into which an electro-acoustic transducer is incorporated has at least two audio signal conductors through which the electro-acoustic transducer or device may be coupled to another device to convey analog audio signals representing sounds at a time when the other device places a relatively low DC bias voltage across the at least two audio signal conductors, and to be operated as a digital serial bus to exchange pieces of digitally-encoded data concerning the electro-acoustic transducer at a time when the other device places a relatively high DC bias voltage across the at least two audio signal conductors.

In one aspect, an apparatus includes an acoustic driver; two audio signal conductors to enable coupling of the apparatus to a device; an audio circuit structured to manipulate an analog audio signal representing a sound provided by the device on the two audio signal conductors to derive a derived sound from the sound, and coupled to the acoustic driver to convey a derived analog audio signal representing the derived sound to the acoustic driver; and a separator circuit coupled to the two audio signal conductors and to the audio circuit. The separator circuit is structured to: employ a first threshold voltage to distinguish between a relatively low DC bias voltage placed across the two audio signal conductors by the device and a first relatively high DC bias voltage placed across the two audio signal conductors by the device; in response to the relatively low DC bias voltage placed across the two audio signal conductors, allow the analog audio signal to be conveyed through the separator circuit from the two audio signal conductors to the audio circuit; and in response to the first relatively high DC bias voltage across the two audio signal conductors, cease to allow an analog signal occurring on one of the two audio signal conductors to be conveyed through the separator circuit to the audio circuit.

Implementations may include, and are not limited to, one or more of the following features. The apparatus of may further include a microphone coupled to the audio circuit; and a MOSFET coupled to the microphone to enable the MOSFET to be operated to bypass the microphone, and having a gate coupled to the separator circuit, wherein the separator circuit is further structured to operate the gate of the MOSFET to cause the MOSFET to bypass the microphone in response to the first relatively high DC bias voltage across the two audio signal conductors.

The apparatus may further include a gain control component operable to control a gain of the audio circuit to compensate for a characteristic of the acoustic driver in response to being accessed and set with a first piece of digitally-encoded data through the two audio signal conductors by the device, wherein: the first piece of digitally-encoded data represents a setting for the gain control component; and the separator circuit is further structured to operate at least the two audio signal conductors as a digital serial bus to enable the first piece of digitally-encoded data to be exchanged between the gain control component and the device through the separator circuit and the two audio signal conductors in response to the first relatively high DC bias voltage across the two audio signal conductors to enable the gain control component to be set with the setting. The gain control component may be a digital potentiometer, and the first piece of digitally-encoded data represents a resistance setting; or may be an amplifier, and the first piece of digitally-encoded data represents a gain setting. The gain control component may include a plurality of storage locations able to store a second piece of digitally-encoded data concerning a characteristic of one of the microphone and the acoustic driver; and the separator circuit is further structured to operate at least the two audio signal conductors as a digital serial bus to enable the second piece of digitally-encoded data to be exchanged between the gain control component and the device through the separator circuit and the two audio signal conductors in response to the first relatively high DC bias voltage across the two audio signal conductors to enable the second piece of digitally-encoded data to be retrieved from one of the plurality of storage locations. The second piece of digitally-encoded data may represent data concerning a characteristic of the electro-acoustic transducer, the characteristic being one of a set consisting of: a measured realizable range of frequencies, a measured resistance across a specific range of frequencies, a measured level of sensitivity across a specific range of frequencies, a serial number enabling a measured characteristic of the electro-acoustic transducer to be obtained from a record, an identity of a manufacturer of the electro-acoustic transducer enabling the manufacturer to be contacted to obtain a measured characteristic of the electro-acoustic transducer, a history of repairs, a history of refurbishment, and a note concerning a suspected mode of failure.

The apparatus may further include a third audio signal conductor coupled to the separator circuit, wherein the separator circuit is further structured to allow another analog signal representing a test sound and provided by the device on the third audio signal conductor and one of the two audio signal conductors to pass through the separator circuit as the separator circuit continues to operate the MOSFET to bypass the microphone to enable a test of the acoustic driver. The apparatus may provides ANR; the audio circuit may include an ANR compensator; the audio circuit may be structured to derive anti-noise sounds as the derived sound; and the test of the acoustic driver may test an operation of the acoustic driver with the ANR compensator.

The apparatus may further include a storage having a plurality of storage locations able to store a first piece of digitally-encoded data and able to provide the first piece of digitally-encoded data in response to being accessed to retrieve the first piece of digitally-encoded data through the two audio signal conductors by the device, wherein: the first piece of digitally-encoded data concerns a characteristic of one of the microphone and the acoustic driver; and the separator circuit is further structured to operate at least the two audio signal conductors as a digital serial bus to enable the first piece of digitally-encoded data to be exchanged between the gain control component and the device through the separator circuit and the two audio signal conductors in response to the first relatively high DC bias voltage across the two audio signal conductors to enable the first piece of digitally-encoded data to be retrieved by the device. The first piece of digitally-encoded data may represent data concerning a characteristic of the microphone, the characteristic being one of a set consisting of: a measured realizable range of frequencies, a measured resistance across a specific range of frequencies, a measured level of sensitivity across a specific range of frequencies, a serial number enabling a measured characteristic of the electro-acoustic transducer to be obtained from a record, an identity of a manufacturer of the electro-acoustic transducer enabling the manufacturer to be contacted to obtain a measured characteristic of the electro-acoustic transducer, a history of repairs, a history of refurbishment, and a note concerning a suspected mode of failure. The separator circuit may include a Zener diode having a threshold voltage that defines the first threshold voltage employed by the separator circuit to distinguish between the relatively low and the first relatively high DC bias voltages.

In another aspect, an apparatus includes an electro-acoustic transducer comprising a diaphragm enabling transduction between acoustic energy and electrical energy; two audio signal conductors to enable coupling of the apparatus to a device; and a separator circuit coupled to the two audio signal conductors. The separator circuit is structured to: employ a threshold voltage to distinguish between a relatively low DC bias voltage placed across the two audio signal conductors by the device and a relatively high DC bias voltage placed across the two audio signal conductors by the device; in response to the relatively low DC bias voltage placed across the two audio signal conductors, allow an analog audio signal representing a sound to be conveyed between the device and the separator circuit through the two audio signal conductors, and allow an AC component of the analog audio signal to pass through the separator circuit to enable transduction between acoustic energy of the sound and electrical energy of the analog audio signal representing the sound; and in response to the relatively high DC bias voltage across the two audio signal conductors, cease to allow an analog signal occurring on one of the two audio signal conductors to be conveyed through the separator circuit to the audio circuit.

Implementations may include, and are not limited to, one or more of the following features. The separator circuit may include a Zener diode having a threshold voltage that defines the threshold voltage employed by the separator circuit to distinguish between the relatively low and the relatively high DC bias voltages.

The apparatus may further include a storage having a plurality of storage locations able to store a first piece of digitally-encoded data and able to provide the first piece of digitally-encoded data in response to being accessed to retrieve the first piece of digitally-encoded data through the two audio signal conductors by the device, wherein: the first piece of digitally-encoded data concerns a characteristic of the electro-acoustic transducer; and the separator circuit is further structured to operate at least the two audio signal conductors as a digital serial bus to enable the first piece of digitally-encoded data to be exchanged between the gain control component and the device through the separator circuit and the two audio signal conductors in response to the first relatively high DC bias voltage across the two audio signal conductors to enable the first piece of digitally-encoded data to be retrieved by the device. The first piece of digitally-encoded data may represent data concerning a characteristic of the electro-acoustic transducer, the characteristic being one of a set consisting of: a measured realizable range of frequencies, a measured resistance across a specific range of frequencies, a measured level of sensitivity across a specific range of frequencies, a serial number enabling a measured characteristic of the electro-acoustic transducer to be obtained from a record, an identity of a manufacturer of the electro-acoustic transducer enabling the manufacturer to be contacted to obtain a measured characteristic of the electro-acoustic transducer, a history of repairs, a history of refurbishment, and a note concerning a suspected mode of failure. The storage may be a component of a digital potentiometer; and the separator circuit is structured to enable the digital potentiometer to be accessed by the device through the two audio signal conductors to convey a second piece of digitally-encoded data to the digital potentiometer to set a level of resistance of the digital potentiometer to compensate for a characteristic of the electro-acoustic transducer represented by the first piece of digitally-encoded data.

In another aspect, a method includes applying a relatively high DC bias voltage across two audio signal conductors of an apparatus to cause the apparatus to cease to operate in an audio mode in which an analog audio signal conveyed through two audio signal conductors of the apparatus from a device coupled to the two audio signal conductors is allowed to pass through a separator circuit of the apparatus to be acoustically output by an acoustic driver of the apparatus.

Implementations may include, and are not limited to, one or more of the following features. The method may further include selecting the two audio signal conductors from among a plurality of at least three or more audio signal conductors of the apparatus to cause the separator circuit to operate a gate of a MOSFET of the apparatus to bypass a microphone of the apparatus to prevent the microphone from providing another analog audio signal representing sounds detected by the microphone to an audio circuit of the apparatus for being acoustically output by the acoustic driver.

The method may further include operating the two audio signal conductors as digital serial bus to write a first piece of digitally-encoded data through the two audio signal conductors and through the separator circuit to a gain control component of the apparatus to set a gain setting of the gain control component. The method may yet further include operating the two audio signal conductors as a digital serial bus to retrieve a second piece of digitally-encoded data from a storage location of the gain control component, wherein the second piece of digitally-encoded data represents data concerning a characteristic of one of the acoustic driver and a microphone of the apparatus, the characteristic being one of a set consisting of: a measured realizable range of frequencies, a measured resistance across a specific range of frequencies, a measured level of sensitivity across a specific range of frequencies, a serial number enabling a measured characteristic of the electro-acoustic transducer to be obtained from a record, an identity of a manufacturer of the electro-acoustic transducer enabling the manufacturer to be contacted to obtain a measured characteristic of the electro-acoustic transducer, a history of repairs, a history of refurbishment, and a note concerning a suspected mode of failure.

In one aspect, an electro-acoustic transducer comprises a diaphragm enabling transduction between acoustic energy and electrical energy; two audio signal conductors to enable coupling of the electro-acoustic transducer to a device; and a separator circuit coupled to the two audio signal conductors. The separator circuit is structured to employ a threshold voltage to distinguish between a relatively low DC bias voltage placed across the two audio signal conductors by the device and a relatively high DC bias voltage placed across the two audio signal conductors by the device; in response to the relatively low DC bias voltage placed across the two audio signal conductors, allow an analog audio signal representing a sound to be conveyed between the device and the separator circuit through the two audio signal conductors, and allow an AC component of the analog audio signal to pass through the separator circuit to enable transduction between acoustic energy of the sound and electrical energy of the analog audio signal representing the sound; and in response to the relatively high DC bias voltage across the two audio signal conductors, operate at least the two audio signal conductors as a digital serial bus to enable a piece of digitally-encoded data to be exchanged between the separator circuit and the device through the two audio signal conductors.

Implementations may include, and are not limited to, one or more of the following features. The separator circuit may include a Zener diode having a threshold voltage that defines the threshold voltage employed by the separator circuit to distinguish between the relatively low and the relatively high DC bias voltages. The electro-acoustic transducer may be an acoustic driver comprising a coil coupled to the diaphragm and to the separator circuit to cooperate with the diaphragm to convert the electrical energy of the analog audio signal representing the sound into the acoustic energy of the sound; and the separator circuit may include a capacitor to enable the AC component of the analog audio signal to pass through the separator circuit between one of the two audio signal conductors and the coil, and to disallow passage of DC bias voltages placed across the two audio signal conductors through the coil.

The electro-acoustic transducer may further include a storage to store the piece of digitally-encoded data and coupled to the separator circuit to enable the device to access the storage through the two audio signal conductors to retrieve the piece of digitally-encoded data from a storage location of the storage. The piece of digitally-encoded data may represent data concerning a characteristic of the electro-acoustic transducer, the characteristic being one of a set consisting of: a measured realizable range of frequencies, a measured resistance across a specific range of frequencies, a measured level of sensitivity across a specific range of frequencies, a serial number enabling a measured characteristic of the electro-acoustic transducer to be obtained from a record, and an identity of a manufacturer of the electro-acoustic transducer enabling the manufacturer to be contacted to obtain a measured characteristic of the electro-acoustic transducer.

The diaphragm may be conductive and coupled to one of the two audio signal conductors; and the electro-acoustic transducer may be an electret microphone comprising: an amplifier having an output coupled to the separator circuit; and a conductive plate coupled to an input of the amplifier and positioned adjacent to the to diaphragm to cooperate with the diaphragm to convert the acoustic energy of the sound into a varying level of capacitance that is amplified by the amplifier to provide the electrical energy of the analog audio signal representing the sound. The electro-acoustic transducer may further include a digital potentiometer interposed between the output of the amplifier and the separator circuit as a gain control component enabling control of a gain of the amplifier to compensate for a characteristic of the electro-acoustic transducer; and wherein the separator circuit is structured to enable the digital potentiometer to be accessed by the device through the two audio signal conductors to convey the piece of digitally-encoded data to the digital potentiometer to set a level of resistance imposed by the digital potentiometer between the output of the amplifier and the separator circuit to control the gain of the amplifier.

In another aspect, an apparatus comprises an acoustic driver; two audio signal conductors to enable coupling of the apparatus to a device; an audio circuit structured to manipulate an analog audio signal representing a sound provided by the device on the two audio signal conductors to derive a derived sound from the sound, and coupled to the acoustic driver to convey a derived analog audio signal representing the derived sound to the acoustic driver; and a separator circuit coupled to the two audio signal conductors and to the audio circuit. The separator circuit is structured to: employ a first threshold voltage to distinguish between a relatively low DC bias voltage placed across the two audio signal conductors by the device and a first relatively high DC bias voltage placed across the two audio signal conductors by the device; in response to the relatively low DC bias voltage placed across the two audio signal conductors, allow the analog audio signal to be conveyed through the separator circuit from the two audio signal conductors to the audio circuit; and in response to the first relatively high DC bias voltage across the two audio signal conductors, operate at least the two audio signal conductors as a digital serial bus to enable a first piece of digitally-encoded data to be exchanged between the separator circuit and the device through the two audio signal conductors.

Implementations may include, and are not limited to, one or more of the following features. The separator circuit may include a Zener diode having a threshold voltage that defines the first threshold voltage employed by the separator circuit to distinguish between the relatively low and the first relatively high DC bias voltages. The apparatus may further include a microphone; and a gain control component operable to control a gain of the audio circuit to compensate for a characteristic of the microphone in response to being accessed and set with the first piece of digitally-encoded data through the two audio signal conductors by the device, wherein the first piece of digitally-encoded data represents a setting for the gain control component. The apparatus may further include a third audio signal conductor, wherein the separator circuit is further structured to: distinguish a second relatively high DC bias threshold voltage across the third audio signal conductor and one of the two audio signal conductors from the first relatively high DC bias threshold across the pair of audio signal conductors; and in response to the second relatively high DC bias voltage across the third audio signal conductor and the one of the two audio signal conductors, operate the third audio signal conductor and the one of the two audio signal conductors as another digital serial bus to enable a second piece of digitally-encoded data to be exchanged between the separator circuit and the device. The apparatus may further include a third audio signal conductor, wherein operating at least the two audio signal conductors as a digital serial bus to enable a first piece of digitally-encoded data to be exchanged between the separator circuit and the device through the two audio signal conductors comprises additionally operating the third audio signal conductor with the two audio signal conductors as the digital serial bus to enable the first piece of digitally-encoded data to be exchanged between the separator circuit and the device through third audio signal conductor and the two audio signal conductors. The apparatus may be a speaker; the audio circuit may be a crossover; the apparatus may further include another acoustic driver coupled to the audio circuit; and the audio circuit may be structured to derive another derived sound from the sound and to provide another derived analog audio signal representing the another derived sound to the another acoustic driver. The apparatus may provide ANR; the audio circuit may include an ANR compensator; the apparatus may further include a microphone coupled to the audio circuit; and the audio circuit may be structured to derive anti-noise sounds as the derived sound.

The apparatus may further include a storage to store the first piece of digitally-encoded data and coupled to the separator circuit to enable the device to access the storage through the two audio signal conductors to retrieve the first piece of digitally-encoded data from a storage location of the storage. The first piece of digitally-encoded data may represent data concerning a characteristic of the electro-acoustic transducer, the characteristic being one of a set consisting of: a measured realizable range of frequencies, a measured resistance across a specific range of frequencies, a measured level of sensitivity across a specific range of frequencies, a serial number enabling a measured characteristic of the electro-acoustic transducer to be obtained from a record, and an identity of a manufacturer of the electro-acoustic transducer enabling the manufacturer to be contacted to obtain a measured characteristic of the electro-acoustic transducer.

The apparatus may further include a gain control component operable to control a gain of the audio circuit to compensate for a characteristic of the acoustic driver in response to being accessed and set with the first piece of digitally-encoded data through the two audio signal conductors by the device, wherein the first piece of digitally-encoded data represents a setting for the gain control component. The gain control component may be a digital potentiometer, and the first piece of digitally-encoded data represents a resistance setting, or the gain control component may be an amplifier, and the first piece of digitally-encoded data represents a gain setting.

The separator circuit may be further structured to: employ a second threshold voltage to distinguish between the first relatively high DC bias voltage and a second relatively high DC bias voltage; and in response to the second relatively high DC bias voltage across the two audio signal conductors, operate at least the two audio signal conductors as a digital serial bus to enable a second piece of digitally-encoded data to be exchanged between the separator circuit and the device through the two audio signal conductors. The second relatively high DC bias voltage may have a similar polarity to the first relatively high DC bias voltage across the two audio signal conductors and may have a greater magnitude of voltage level than the first relatively high DC bias voltage; or the second relatively high DC bias voltage may have a polarity across the two audio signal conductors that is opposite to a polarity of the first relatively high DC bias voltage across the two audio signal conductors. The separator circuit may be further structured to: enable access to a first component of the apparatus by the device through the two audio signal conductors to enable an exchange of the first piece of digitally-encoded data between the device and the first component through the separator circuit in response to the first relatively high DC bias voltage across the two audio signal conductors; and enable access to a second component of the apparatus by the device through the two audio signal conductors to enable an exchange of the second piece of digitally-encoded data between the device and the second component through the separator circuit in response to the second relatively high DC bias voltage across the two audio signal conductors. The separator circuit may be further structured to: enable access to a first storage location of a storage off the apparatus by the device through the two audio signal conductors to enable an exchange of the first piece of digitally-encoded data between the device and the first storage location of the storage through the separator circuit in response to the first relatively high DC bias voltage across the two audio signal conductors; and enable access to a second storage location of the storage by the device through the two audio signal conductors to enable an exchange of the second piece of digitally-encoded data between the device and the second storage location of the storage through the separator circuit in response to the second relatively high DC bias voltage across the two audio signal conductors.

In another aspect, a method includes applying a relatively high DC bias voltage across two audio signal conductors of an apparatus to cause the apparatus to enable operation of the two audio signal conductors as a digital serial bus to enable an exchange of a first piece of digitally-encoded data with the apparatus through the two audio signal conductors, wherein the apparatus is structured to enable the two audio signal conductors to convey an analog audio signal representing a sound in response to a relatively low DC bias voltage across the two audio signal conductors; and exchanging the first piece of digitally-encoded data across the two audio signal conductors.

Implementations may include, and are not limited to, one or more of the following features. The method may further include accessing a storage location of a storage of the apparatus to enable the first piece of digitally-encode data to be retrieved from the storage location, wherein exchanging the first piece of digitally-encoded data across the two signal conductors comprises retrieving the first piece of digitally-encoded data from the storage location. Retrieving the first piece of digitally-encoded data from the storage location may include retrieving data concerning a characteristic of an electro-acoustic transducer of the apparatus, the characteristic being one of a set consisting of: a measured realizable range of frequencies, a measured resistance across a specific range of frequencies, a measured level of sensitivity across a specific range of frequencies, a serial number enabling a measured characteristic of the electro-acoustic transducer to be obtained from a record, and an identity of a manufacturer of the electro-acoustic transducer enabling the manufacturer to be contacted to obtain a measured characteristic of the electro-acoustic transducer. The method may further include accessing a gain control component of the apparatus to enable a gain control setting of the gain control component to be set with the first piece of digitally-encode data, wherein exchanging the first piece of digitally-encoded data across the two signal conductors comprises writing the first piece of digitally-encoded data to the gain control component to set the gain control setting.

Other features and advantages of the invention will be apparent from the description and claims that follow.

DESCRIPTION OF THE DRAWINGS

FIG. 1b is a signal diagram depicting differing DC voltage levels at which analog audio signals and digitally-encoded data are transferred via the audio signal conductors of the acoustic driver of FIG. 1a.

FIG. 2a is a block diagram of an electret microphone having a storage for data transferred via its audio signal conductors and/or an amplifier tunable with data transferred via its audio signal conductors.

FIG. 2b is a signal diagram depicting differing DC voltage levels at which analog audio signals and digitally-encoded data are transferred via the audio signal conductors of the electret microphone of FIG. 2a.

FIG. 3b is a signal diagram depicting differing DC voltage levels at which analog audio signals and digitally-encoded data are transferred via the audio signal conductors of the two-way speaker of FIG. 3a.

DETAILED DESCRIPTION

What is disclosed and what is claimed herein is intended to be applicable to a wide variety of electro-acoustic transducers and devices incorporating electro-acoustic transducers. Alternatively and/or additionally, what is disclosed and what is claimed herein is intended to be applicable to a wide variety of devices incorporating electro-acoustic transducers and incorporating audio signal conductors by which those devices are able to be coupled to other devices to exchange analog audio signals representing audio. This includes personal devices carried or worn by a person such as headphones, active noise reduction (ANR) headsets, two-way communications headsets (e.g., pilot headsets), wireless headsets (a.k.a., "earsets"), earphones (a.k.a., "earbuds"), clip-on microphones, walkie-talkies and cell phones, as well as the relatively small electro-acoustic transducers often incorporated into such devices (e.g., discrete dynamic or electret microphone elements, etc.). This also includes devices that are more stationary in nature such that they are normally meant to occupy a particular location within a room or other space, such as boxed speakers, self-amplified speakers, surround sound satellite speakers, center channel speakers, subwoofers, speakers incorporating multiple acoustic drivers controlled through a crossover, electrostatic speakers, suspended or podium microphones, professional recording microphones, camera microphones, as well as the relatively larger electro-acoustic transducers often incorporated into such devices (e.g., tweeters, woofers, mid-range acoustic drivers, Mylar film acoustic drivers, etc.).

Figure 1A:
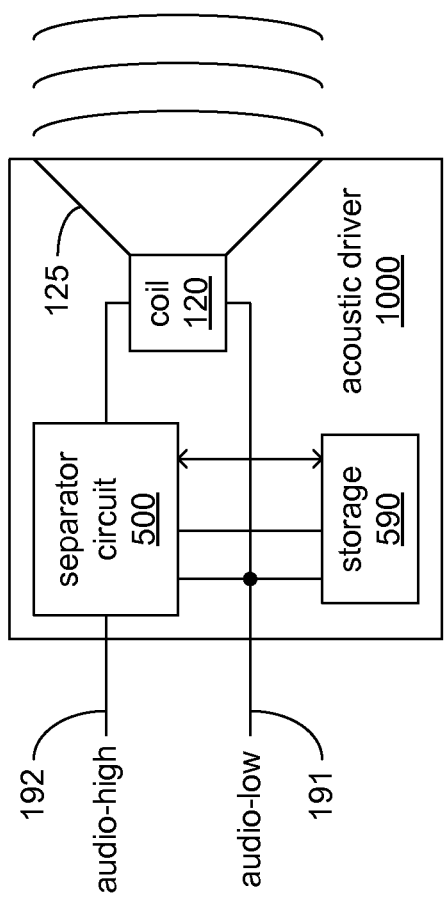
FIG. 1a is a block diagram of an acoustic driver having a storage for data transferred via its audio signal conductors.
Figure 1B:
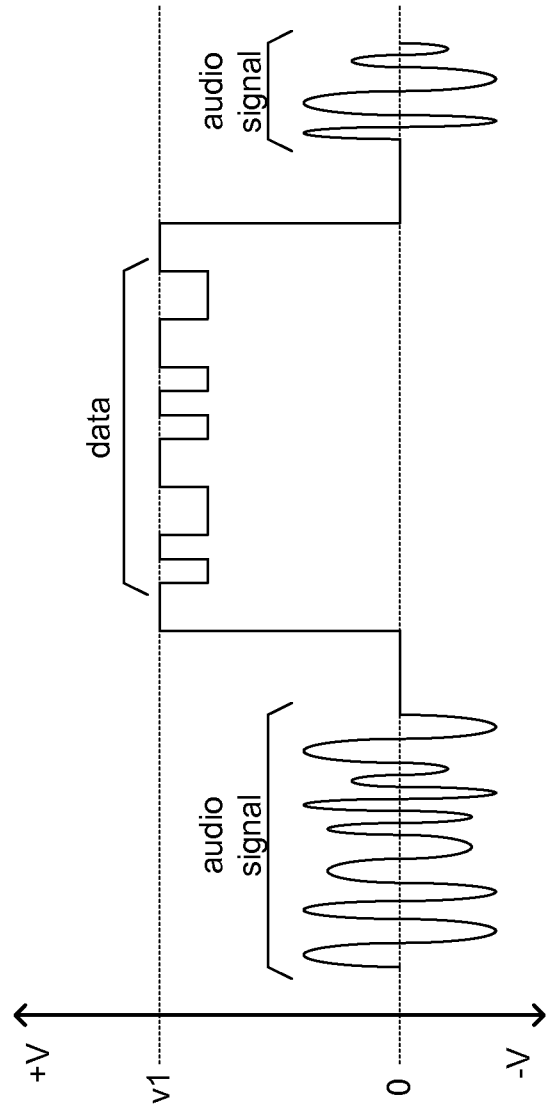

FIG. 1a is a block diagram of an acoustic driver 1000, and FIG. 1b is a diagram of voltage activity across audio signal conductors of the acoustic driver 1000 to aid in distinguishing analog signals conveying audio from other signals conveying digitally-encoded data. As will be familiar to those skilled in the art, the acoustic driver 1000 is a form of electro-acoustic transducer. In the case of the acoustic driver 1000, the transduction that takes places is a conversion of electrical energy in the form of analog signals representing a sound received by the acoustic driver 1000 via an audio-low conductor 191 and an audio-high conductor 192 (i.e., via a pair of audio signal conductors) being converted into acoustic energy in the form of the acoustic output of the sound through a coil 120 and a diaphragm 125. The acoustic driver 1000 incorporates the coil 120, the diaphragm 125, the audio-low conductor 191, the audio-high conductor 192, a separator circuit 500 and a storage 590. The audio-low conductor is coupled to each of the coil 120, the separator circuit 500 and the storage 590. The audio-high conductor 192 is coupled to the separator circuit 500, and in turn, the separator circuit 500 is AC-coupled to the coil 120 and the storage 590.

During normal operation of the acoustic driver 1000 in its intended role of acoustically outputting sounds (i.e., during it's "audio mode"), the acoustic driver 1000 is coupled via the audio-low conductor 191 and the audio-high conductor 192 to a source device (not shown) or to other components of a device into which the acoustic driver is also incorporated (also not shown), and the acoustic driver 1000 is provided with an analog signal representing sounds via these two audio signal conductors. As will be familiar to those skilled in the art, the audio-low conductor 191 and the audio-high conductor 192 are used together as a pair of audio signal conductors to convey such analog audio signals, with one serving as a return current path for the other. Such analog audio signals may include a relatively low direct current (DC) bias voltage (as depicted in FIG. 1b, this low DC bias voltage may be no DC bias voltage, at all).

However, at other times when the acoustic driver 1000 is not being operated in its audio mode to acoustically output sounds, the acoustic driver 1000 may be coupled via the audio-low conductor 191 and the audio-high conductor 192 to another device (not shown) that exchanges pieces of digitally-encoded data with the acoustic driver 1000 (i.e., the acoustic driver 1000 is caused to enter into a "data mode"). This exchange of data is performed by using the audio-low conductor 191 and the audio-high conductor 192 together as a pair to form a digital serial bus, where the audio-high conductor 192 is employed as a serial data conductor and the audio-low conductor 191 is employed as the matching ground conductor. This use of these two audio signal conductors as a digital serial bus is accompanied with and is enabled by the provision of a relatively high bias voltage, depicted as the DC voltage level "v1" in FIG. 1b, across these two audio signal conductors. Thus, these two audio signal conductors are employed to form a two-conductor digital serial bus using digital serial data transfer techniques well understood by those skilled in the art, but with the difference of being combined with a relatively high DC bias voltage.

The separator circuit 500 determines whether the acoustic driver 1000 is being operated in its audio mode or in its data mode by the magnitude of the DC bias voltage placed across the audio-low conductor 191 and the audio-high conductor 192 by an external device to which the acoustic driver 1000 is coupled via these two audio signal conductors. Where there is a relatively low DC bias voltage (possibly low enough that there is no DC bias voltage at all), the separator circuit 500 simply allows the alternating current (AC) component of analog audio signals (the portion of analog audio signals that actually represents sounds) to pass through the separator circuit 500 between the audio-high conductor 192 and another conductor coupling the separator circuit 500 to the coil 120, thereby providing a complete circuit between the audio-low conductor 191 and the audio-high conductor 192 through the separator circuit 500 and the coil 120 by which the afore-described process of transduction to acoustically output sounds takes place (i.e., the acoustic driver 1000 is operated in audio mode). However, where there is a relatively high DC bias voltage, the separator circuit 500 ceases to pass AC signals through the coil 120, and instead, enables the storage 590 to be accessed to at least allow digitally-encoded data stored within storage locations of the storage 590 to be retrieved from the storage 590 and output by the acoustic driver 1000 via the audio-high conductor 192 from the storage 590 (i.e., the acoustic driver 1000 is operated in data mode). Further, where the storage 590 is based on a technology that enables storage locations within the storage 590 to be rewritten (possibly stored in storage locations that are first electrically erased), storage locations within the storage 590 may be written with digitally-encoded data input to the acoustic driver 100 via these audio signal conductors to store new digitally-encoded data.

The separator circuit 500 may incorporate components that are selected and/or interconnected in a manner that imposes at least one threshold voltage against which whatever DC bias voltage is present across the audio-low conductor 191 and the audio-high conductor 192 is compared to distinguish a relatively high DC bias voltage that enables the data mode from a relatively low DC bias voltage that enables the audio mode. It is preferred that the threshold voltage be greater than the greatest magnitude of voltage that is expected to be placed across these two audio signal conductors due to the AC component of any analog audio signal representing audio that is expected to be provided to the acoustic driver 1000 via these two audio conductors. In some embodiments, the separator circuit 500 may be implemented with a capacitor interposed between the audio-high conductor 192 and the conductor coupling the separator circuit 500 to the coil 120, and with a Zener diode interposed between the audio-high conductor 192 and the storage 590. As will be familiar to those skilled in the art, each Zener diode has a threshold voltage, and a Zener diode incorporated into the separator circuit 500 may be selected to define a threshold voltage to be imposed by the separator circuit 500 to distinguish between the relatively high and relative low DC bias voltages associated with the data and audio modes, respectively.

The storage 590 may be any of a wide variety of types of storage device, but is preferably a solid-state electronic storage device that does not require an external supply of electric power to maintain data within it (i.e., what is commonly referred to as a "nonvolatile" storage device). Thus, the storage 590 may be based on any of a variety of nonvolatile solid-state data storage technologies, including and not limited to, electrically-erasable programmable read-only memory, FLASH, battery-back static random access memory (SRAM), etc. More specifically, in at least some embodiments, the storage 590 may be an EEPROM with a 1-Wire® digital serial bus interface (promulgated by and a registered trademark of Dallas Semiconductor, a division of Maxim Integrated Products of Sunnyvale, Calif.), and the separator circuit 500 may enable the audio-high conductor 192 to be operated as a digital serial bus that at least somewhat resembles a 1-Wire digital serial bus while the acoustic driver 1000 is being operated in data mode.

In some embodiments, the storage 590 may store any of a variety of pieces of data concerning operating characteristics of the acoustic driver 1000 derived from testing of the acoustic driver 1000, perhaps by its manufacturer. Such characteristics could include, but are not limited to, a range of frequencies able to be acoustically output, actual measured resistance of the coil 120, a measured variation in acoustic output across a specified range of frequencies, etc. Alternatively and/or additionally, such data as a serial number, a date of manufacture and/or an identity of the manufacturer may be stored. A stored serial number may enable desired characteristics to be obtained from records of testing done by the manufacturer of the acoustic driver 1000. Also alternatively and/or additionally, a history of repairs and/or refurbishing, installations in one or more devices, whether or not the acoustic driver 1000 is a replacement of another acoustic driver 1000, etc., may be stored, thereby enabling future decisions regarding repair or replacement to be made with knowledge of the past, especially if there are suspicions of a recurring failure that is difficult to verify.

It should be noted that although FIG. 1*b* depicts occurrences of analog audio signals in the same graph alongside an occurrence of a exchange of digitally-encoded data, this such depiction should not be taken as suggesting that such a combination of different uses of the audio-high conductor 192 and the audio-low conductor 191 must necessarily be interwoven in this way. In some situations, it may be that the acoustic driver 1000 is coupled by these two audio signal conductors to a single device (or components of a single device into which the acoustic driver 1000 is incorporated) capable of engaging in both the provision of analog audio signals to the acoustic driver 1000 and the exchange of digitally-encoded data. However, it is also contemplated that there will be situations in which the exchange of digitally-encoded data occurs principally at the time the acoustic driver 1000 (or a device into which the acoustic driver 1000 is being incorporated) is manufactured, replaced and/or repaired. And, that otherwise, these audio conductors are normally employed solely for the provision of analog audio signals to the acoustic driver 1000. In other words, as described earlier in reference to FIGS. 1*a-b*, the acoustic driver 1000 may be operated in audio mode when coupled to one device and be operated in data mode when coupled to another device. Therefore, FIG. 1*b*, although suggestive of there being an interweaving of being operated in audio mode and in data mode by a single device to which the acoustic driver 1000 may be coupled, FIG. 1*b* should not be taken as mandating this.

FIG. 2*a* is a block diagram of an electret microphone 2000, and FIG. 2*b* is a diagram of voltage activity across audio signal conductors of the electret microphone 2000 to aid in distinguishing analog signals conveying audio from other signals conveying digitally-encoded data. As will be familiar to those skilled in the art, the electret microphone 2000 is another form of electro-acoustic transducer. In the case of the electret microphone 2000, the transduction that takes places is a conversion of acoustic energy in the form of a sound vibrating a conductive diaphragm spaced away from a conductive plate (these two conductive components being within an electret element 200 depicted in FIG. 2*a*) resulting in a changing capacitance that is converted by an amplifying device of the electret microphone (in this case, a JFET 230, as depicted in FIG. 2*a*) into electrical energy in the form of analog signals representing the sound vibrating the conductive diaphragm (more succinctly, a conversion from acoustic energy to electrical energy). In other words, the sound is, in this way, detected by the electret element 200, and the JFET 230 creates these analog audio signals representing the sound. These analog signals representing the detected sound are output by the electret microphone 2000 via a mic-low conductor 291 and a mic-high conductor 292 (i.e., via a pair of audio signal conductors of the electret microphone 2000). The electret microphone 2000 incorporates an electret element 220 made up of the conductive diaphragm and conductive plate, the JFET 230, a separator circuit 500, and one or both of a digital potentiometer 535 and a storage 590. The mic-low conductor 291 is coupled to each of the electret element 220, the JFET 230, the separator circuit 500 and the storage 590 (if present). The mic-high conductor 292 is coupled to the separator circuit 500, and in turn, the separator circuit 500 is coupled to the electret element 220 through the digital potentiometer 535 (if present) and the JFET 230.

During normal operation of the electret microphone 2000 in its intended role of electrically outputting an analog signal representing sounds detected by the electret element 220 (i.e., during its "audio mode"), the electret microphone 2000 is coupled via the mic-low conductor 291 and the mic-high conductor 292 to a receiving device (not shown) or to components of a device into which the electret microphone 2000 is incorporated (also not shown) that provides the electret microphone 2000 with a relatively low DC bias voltage (depicted as "vb" in FIG. 2*b*) by which a voltage potential is provided to charge the conductive diaphragm and the conductive plate of the electret element 220 (to enable the creation of the aforementioned changing capacitance), and by which power is provided to the JFET 230 to enable its operation as a amplifier. As will be familiar to those skilled in the art, the mic-low conductor 291 and the mic-high conductor 292 are used together as a pair of audio signal conductors both to provide such a relatively low DC bias voltage to the electret microphone 2000, and to receive an analog audio signal from the electret microphone 2000 in the form of an AC signal component superimposed on the relatively low DC bias voltage, as depicted in FIG. 2*b*.

However, at other times when the electret microphone 2000 is not being operated in its audio mode to acoustically output sounds, the electret microphone 2000 may be coupled via the mic-low conductor 291 and the mic-high conductor 292 to another device (not shown) that exchanges digitally-encoded data with the electret microphone 2000 (i.e., the electret microphone 2000 is caused to enter into a "data mode"). In a manner very much like what has been discussed with regard to the acoustic driver 1000, this exchange of data is performed by using the mic-low conductor 291 and the mic-high conductor 292 together as a pair to form a digital serial bus, where the mic-high conductor 292 is employed as a serial data conductor and the mic-low conductor 291 is employed as the matching ground conductor. This use of these two conductors as a digital serial bus is accompanied with and is enabled by the provision of a relatively high bias voltage, depicted as the voltage level "v1" in FIG. 2*b*, across these two conductors.

In a manner very much like what was discussed with regard to the acoustic driver 1000, the separator circuit 500 determines whether the electret microphone 2000 is being operated in its audio mode or in its data mode by the magnitude of the bias voltage placed across the mic-low conductor 291 and the mic-high conductor 292 by an external device to which the electret microphone 2000 is coupled via these two audio signal conductors. Where there is the relatively low DC bias voltage (vb) required for normal operation of the electret microphone 2000 the separator circuit 500 simply allows the alternating current (AC) component of analog audio signals representing detected sounds to pass through the separator circuit 500 from amplified output of the JFET 230 (and possibly through the digital potentiometer 535) and to the mic-high conductor 292, thereby providing a complete circuit between the mic-low conductor 291 and the mic-high conductor 192 through the separator circuit 500.

However, where there is a relatively high DC bias voltage (v1), the separator circuit 500 ceases to pass AC signals received from the JFET 230, and instead, enables one or both of the digital potentiometer 535 and the storage 590 to be accessed. Some embodiments of the electret microphone 2000 may incorporate the digital potentiometer 535, while others may incorporate the storage 590, and still others may incorporate both. Where both are incorporated, a protocol and/or device selection scheme (e.g., device addressing) may be employed to select one or the other for being accessed through operation of the mic-low conductor 291 and the mic-high conductor 292 as a digital serial bus.

Where the storage 590 is present, it may be any of a wide variety of types of storage device, and is preferably a solid-state electronic storage device that does not require an external supply of electric power to maintain data within it (i.e., it is nonvolatile data storage). Also, not unlike the storage 590 of the acoustic driver 1000, the storage 590 of the electret microphone 2000 may store any of a variety of pieces of data concerning operating characteristics of the electret microphone 2000 derived from testing of the electret microphone 2000, perhaps by its manufacturer. Such characteristics could include, but are not limited to, average sensitivity, a range of frequencies of sounds able to be detected, an actual measured resistance, a measured variation in amplitude of analog signal output across a specified range of frequencies, etc. Alternatively and/or additionally, such data as a serial number, a date of manufacture and/or an identity of the manufacturer may be stored by which data concerning characteristics of the electret microphone 2000 measured by its manufacturer may then be obtained from records kept by the manufacturer (or others). Also alternatively and/or additionally, a history of repairs and/or refurbishing, installations in one or more devices, whether or not the electret microphone 2000 is a replacement of another electret microphone 2000, etc., may be stored, thereby enabling future decisions regarding repair or replacement to be made with knowledge of the past, especially if there are suspicions of a recurring failure that is difficult to verify. Again, the exchange of digitally-encoded data across the digital serial bus formed with these two audio conductors may be employed to at least retrieve data stored within storage locations of the storage 590, if not also to write data into storage locations of the storage 590 (i.e., store new digitally-encoded data).

Where the digital potentiometer 535 is present, it is a digitally controllable variable resistor in which the resistance it imposes on the coupling between the output of the JFET 230 and the separator circuit 500 is tunable (i.e., can be varied) with digital data received by the electret microphone 2000 during data mode that correlates to a chosen amount of resistance to which the digital potentiometer 535 is to be set. Through the digital potentiometer 535, the gain in the analog signal provided by the JFET 230 is able to be controlled such that the digital potentiometer 535 serves as a gain control component of the electret microphone 2000. Having such a gain control component may be deemed desirable where a specific sensitivity of the electret microphone 2000 for a specific range of frequencies is desired, and variances in the sensitivities of different ones of the electret microphone 2000 are being encountered as they are manufactured such that being able to tune the sensitivity with the digital potentiometer 535 allows a manufacturer to provide multiple ones of the electret microphone 2000 with a consistent sensitivity (perhaps a desired sensitivity that fits an ideal standard that the manufacturer wants to achieve with each one of those electret microphones).

The exchange of digitally-encoded data across the digital serial bus formed with these two audio conductors may be employed to at least write digitally-encoded data representing a chosen amount of resistance to the digital potentiometer 535. Further, this same digital serial bus may also be employed to retrieve digitally-encoded data from the digital potentiometer 535 that represents the amount of resistance to which the digital potentiometer 535 is currently set, if the digital potentiometer 535 supports such retrieval of data. Still further, in some embodiments, the digital potentiometer 535 may incorporate one or more storage locations into which digitally-encoded data representing information other than a resistance setting for the digital potentiometer 535 may be stored. In such embodiments, this may obviate the need to incorporate the separate storage 590 to provide storage locations for storage of data representing characteristics of the electret microphone 2000.

In the cases of both the acoustic driver 1000 and the electret microphone 2000, incorporating the storage 590 (and/or incorporating a variant of the digital potentiometer 535 having storage locations for data) in which is stored data specifying actual measured characteristics, allows adjustments to be made to other components of a device into which either of these electro-acoustic transducers may be incorporated to compensate for variances in those characteristics from a desired ideal of those characteristics (whether the ideal characteristics are those sought be achieved by the manufacturer of one of these electro-acoustic transducers, or are those sought after by the manufacturer of a device into which one of these electro-acoustic transducers is being incorporated). Alternatively and/or additionally, incorporating the storage 590 (and/or incorporating a variant of the digital potentiometer 535 having storage locations for data) in which data specifying actual measured characteristics is stored also allows replacement ones of the acoustic driver 1000 and/or the electret microphone 2000 having similar characteristics to be readily identified and selected for use when an earlier-installed one of these electro-acoustic transducers needs to be replaced in a device that is being serviced, thereby obviating the need to repeat the process of tuning another component (e.g., a gain control component such as the digital potentiometer 535 of FIG. 2a) within that device to compensate for different characteristics of a replacement one of these electro-acoustic transducers. Similarly, where a component of a device incorporating one of the acoustic driver 1000 and/or of the electret microphone 2000 needs to be replaced, and that component incorporates a tunable component (e.g., a gain control component such as the digital potentiometer 535 of FIG. 2a) that was tuned to compensate for a specific one of these electro-acoustic transducers, the data specifying measured characteristics of that one of these electro-acoustic transducers could be used to recreate the same tuning in the replacement component.

Figure 3A:
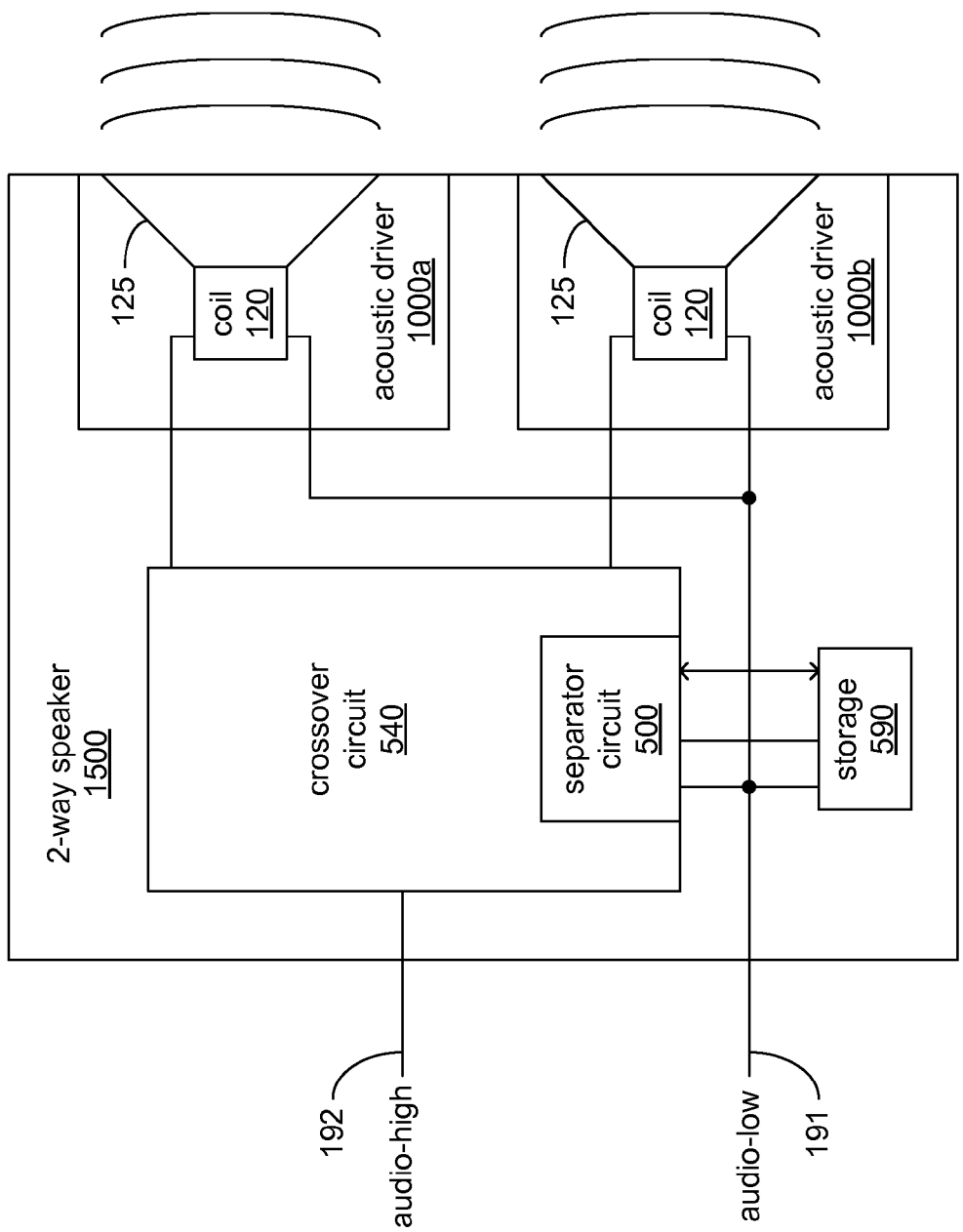
FIG. 3a is a block diagram of a two-way speaker with a crossover having a storage for data transferred via its audio signal conductors and/or gain control components tunable with data transferred via those audio signal conductors.
Figure 3B:
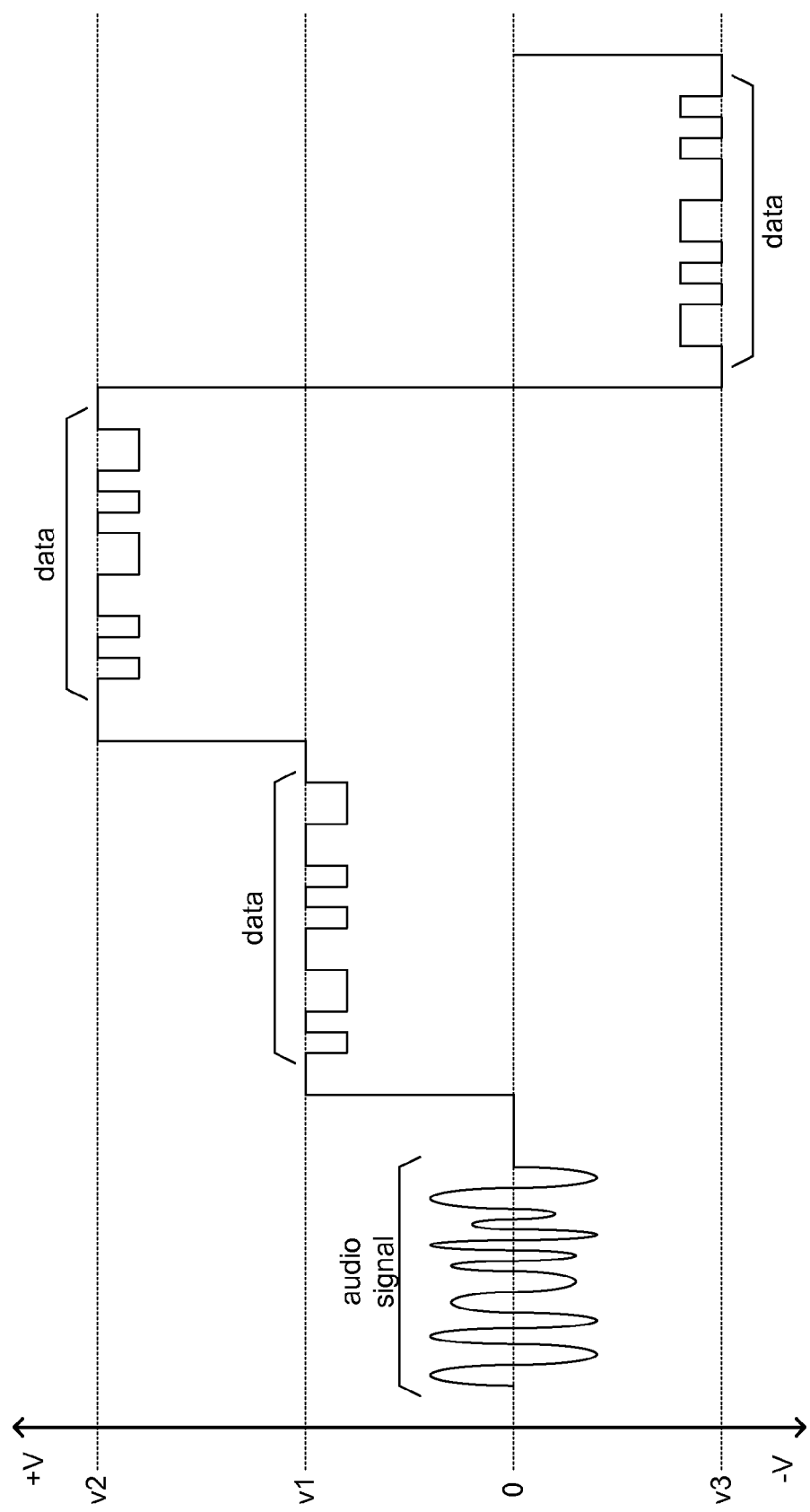

FIG. 3a is a block diagram of a two-way speaker 1500, and FIG. 3b is a diagram of voltage activity across audio signal conductors of the two-way speaker 1500 to aid in distinguishing analog signals conveying audio from other signals conveying digitally-encoded data. As will be familiar to those skilled in the art, the two-way speaker 1500 receives an analog audio signal representing a sound to be acoustically output through a pair of audio signal conductors in a manner very much like a single acoustic driver (e.g., the acoustic driver 1000 of FIG. 1a). However, the two-way speaker 1500 has a crossover circuit 540, an audio circuit that is employed to manipulate the received analog audio signal representing that sound by separating it into two separate analog audio signals that each represent portions of the original sound that occupy only a subset of the original range of audible frequencies of the original sound and that are separately provided to separate ones of the acoustic drivers 1000a and 1000b. The two-way speaker 1500 incorporates a separator circuit 500, the crossover circuit 540, a storage 590, and the pair of acoustic drivers 1000a and 1000b. In a manner very much like the acoustic driver 1000, the audio-low conductor 191 is coupled to each of the crossover circuit 540 (including the separator circuit 500 incorporated into the crossover circuit 540, as depicted), the storage 590, and a coil 120 incorporated into each of the acoustic drivers 1000a and 1000b. The audio-high conductor 192 is coupled to the crossover circuit 540 (including the separator circuit 500), and in turn, the crossover circuit 540 is AC-coupled with separate conductors to coils 120 of each of the acoustic drivers 1000a and 1000b.

Very much like the acoustic driver 1000, the normal operation (i.e., the "audio mode") of the two-way speaker 1500 entails being coupled via the audio-low conductor 191 and the audio-high conductor 192 to a source device (not shown) that provides the two-way speaker 1500 with an analog audio signal representing sounds to be acoustically output. Again, the analog signal may include a relatively low DC bias voltage (as depicted in FIG. 3b, this relatively low DC bias voltage may be no DC bias voltage, at all).

However, unlike the acoustic driver 1000, the acoustic drivers 1000a and 1000b of the two-way speaker 1500 do not, themselves, incorporate a storage device within which digitally-encoded data may be stored. Instead, the storage 590 is coupled to (or may alternatively be incorporated into) the crossover circuit 540 into which the separator circuit 500 is incorporated. Within the storage 590 may be stored data concerning characteristics of each of the acoustic drivers 1000a and 1000b to enable the tuning of one or more gain control components (not shown) of the crossover circuit 540 to compensate for variances in each of their measured acoustic outputs, the range of frequencies each is capable of acoustically outputting, and/or other characteristics of each. Alternatively and/or additionally, a history of repairs and/or refurbishing, replacements of one or both of the acoustic drivers 1000a or 1000b (and/or of other components), etc., may be stored, thereby enabling future decisions regarding repair or replacement to be made with knowledge of the past, especially if there are suspicions of a recurring failure that is difficult to verify.

At other times when the two-way speaker 1500 is not being operated in its audio mode to acoustically output sounds, the acoustic driver 1000 may be coupled via the audio-low conductor 191 and the audio-high conductor 192 to another device (not shown) that uses the audio-low conductor 191 and the audio-high conductor 192 together as a pair to form a digital serial bus to exchange digitally-encoded data. Very much like the acoustic driver 1000 and the electret microphone 2000, this use of these two audio signal conductors as a digital serial bus is accompanied with and is enabled by the provision of a relatively high DC bias voltage to enable the "data mode" of the two-way speaker 1500. However, turning to FIG. 3b, the separator circuit 500 of the two-speaker 1500 is somewhat more sophisticated and can be triggered to exchange different pieces of digital data depending on the magnitude of the relatively high DC bias voltage that is applied to the audio-low conductor 191 and the audio high conductor 192. More precisely, different pieces of digital data are exchanged depending on which one of two relatively high DC bias voltages ("v1" or "v2") is applied to those audio signal conductors.

The separator circuit 500 determines whether the two-way speaker 1500 is being operated in its audio mode or in its data mode by the magnitude of the DC bias voltage placed across the audio-low conductor 191 and the audio-high conductor 192. Where there is a relatively low DC bias voltage (including where there is no DC bias voltage, at all), the separator circuit 500 simply allows the alternating current (AC) component of analog audio signals representing sounds to simply be received and split into two ranges of frequencies that each represent a subset of the full range of frequencies of those sounds by the crossover circuit 540, and then allows separate analog audio signals representing the different ones of those subsets of the sounds to be conveyed by the crossover circuit 540 to the coils 120 of different ones of the acoustic drivers 1000a and 1000b. However, where there is a relatively high DC bias voltage (either "v1" or "v2"), the separator circuit 500 cooperates with the crossover circuit 540 to cease to pass signals to the coils 120 of the acoustic drivers 1000a and 1000b, and instead, enables the exchange of digital data.

In some embodiments, the ability of the separator circuit 500 of the two-way speaker 1500 to distinguish between the different relatively higher DC bias voltages "v1" and "v2" enables different memory locations within the storage 590 to be accessed, perhaps to enable a choice between accessing data concerning one or the other of the acoustic drivers 1000a and 1000b. Thus, the choice between "v1" and "v2" becomes somewhat akin to manipulating an address bit in a memory addressing scheme. In other embodiments, the ability to distinguish between these two relatively high DC bias voltages enables a selection between accessing the storage 590 to retrieve data from it and accessing the storage 590 to write new data into it so as to store that new data within the storage 590. Thus, the choice between "v1" and "v2" becomes a choice between reading and writing data operations. In still other embodiments, the ability to distinguish between these two relatively high DC bias voltages enables a selection between accessing the storage 590 and accessing one or more digital potentiometers and/or one or more other forms of gain control devices that may be incorporated into the crossover circuit 540 (e.g., amplifiers with variable gain). Thus, the choice between "v1" and "v2" becomes a form of device selector or "chip select" signal. Again, one or more of any gain control devices may incorporate data storage locations unrelated to whatever settings associated with gain to which those gain control devices may be set, thereby obviating the need for the storage 590 to provide data storage. Where the differing ones of the relatively high DC bias voltages are employed as a form of chip select, the selection may be between one or more of such gain control devices associated with one of the acoustic drivers 1000a and 1000b versus one or more of such gain control devices associated with the other, with data concerning characteristics of each of the acoustic drivers 1000a and 1000b being separately stored in the one or more gain control devices separately associated with each.

FIG. 3b further depicts an alternative to employing relatively high DC bias voltages of differing magnitudes in addressing schemes, or selection between read and write operations and/or between different components for access. In particular, in addition to the relatively high DC bias voltages "v1" and "v2" having the same polarity, FIG. 3b also depicts a relatively high DC bias voltage "v3" having a relatively high magnitude that is to the magnitude of the "v1" DC bias voltage, but an opposite polarity. This may be deemed desirable as enabling variants of the separator circuit 500 in which different Zener diodes having the same threshold voltage, but interconnected to respond to relatively high bias voltages of opposing polarities to provide more complex functionality in a variation of the separator circuit 500 that remains of relatively simple design.

It should be noted that although FIG. 3b depicts an occurrence of analog audio signals in the same graph alongside occurrences of exchanges of digitally-encoded data, this such depiction should not be taken as suggesting that such a combination of different uses of the audio-high conductor 192 and the audio-low conductor 191 must necessarily be interwoven in this way. In other words, differing devices supporting only one or the other of the provision of analog audio signals and the exchange of digitally-encoded data may be coupled via these audio signal conductors to the two-way speaker 1500, as well as a single device supporting both, and perhaps supporting interweaving these different uses of these audio signal conductors. Therefore, FIG. 3b, although suggestive of there being an interweaving of being operated in audio mode and in data mode by a single device to which the two-way speaker 1500 may be coupled, FIG. 3b should not be taken as mandating this.

Figure 4A:
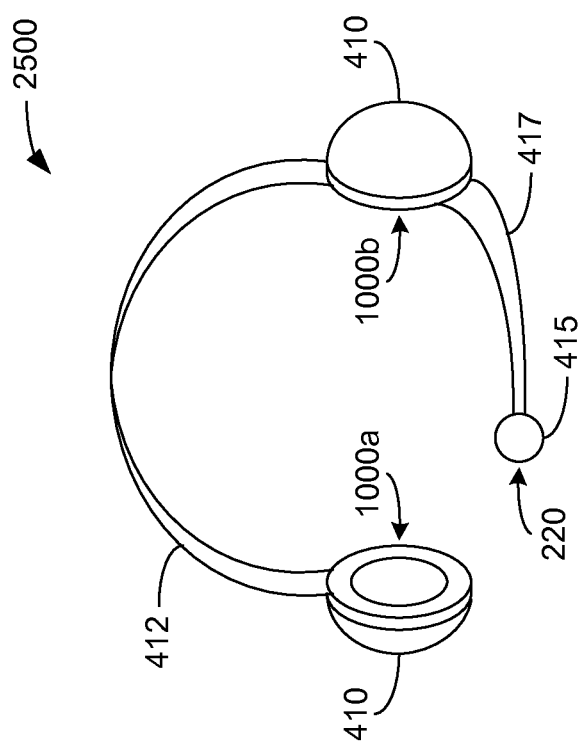
FIG. 4a is a perspective view of a two-way communications headset.
Figure 4B:
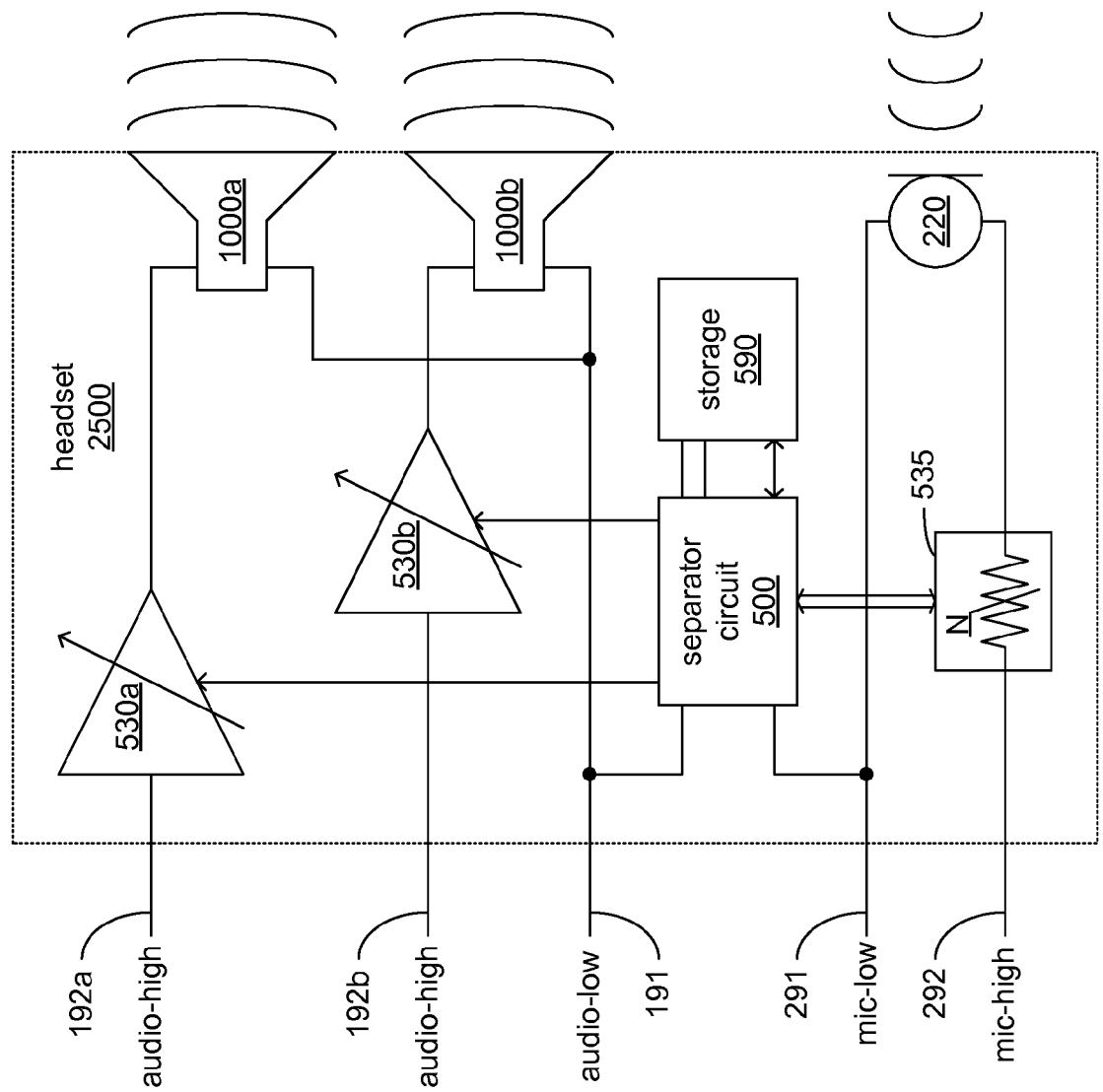
FIG. 4b is a block diagram of the headset of FIG. 4a depicting a storage for data transferred via audio signal conductors of the headset and/or gain control components tunable with data transferred via those audio signal conductors.

FIG. 4a is a perspective view of a two-way communications headset 2500, and FIG. 4b is a block diagram of the headset 2500. In a manner that will be familiar to those skilled in the art, the headset 2500 both receives analog audio signals representing left and right audio channels of sound to be acoustically output by a pair of acoustic drivers 1000a and 1000b through a trio of audio signal conductors, and outputs a different analog audio signal representing a different sound that is detected by a microphone 220 through a pair of different audio signal conductors. Regarding its physical configuration, the headset 2500 incorporates a pair of earpieces 410 incorporating one each of the acoustic drivers 1000a and 1000b, a headband 412 coupling together the pair of earpieces 410, a microphone casing 415 within which is positioned the microphone 220, and a microphone boom 417 coupling the microphone casing 415 to one of the earpieces 410. Regarding its electrical architecture, the headset 2500 incorporates the microphone 220, a separator circuit 500, a pair of amplifiers 530a and 530b, a digital potentiometer 535, and pair of acoustic drivers 1000a and 1000b.

In a manner very much like the acoustic driver 1000 of FIG. 1a, an audio-low conductor 191 is coupled to each of the separator circuit 500, the separator circuit 500, the storage 590, and the acoustic drivers 1000a and 1000b. Audio-high conductors 192a and 192b are coupled to the inputs of the amplifiers 530a and 530b, respectively, and in turn, the outputs of each of the amplifiers 530a and 530b are coupled to the acoustic drivers 1000a and 1000b, respectively. Further, like the electret microphone 2000 of FIG. 2a, a mic-low conductor 291 is coupled to both the separator circuit 500 and the microphone 220. A mic-high conductor 292 is coupled to the digital potentiometer 535, and in turn, the digital potentiometer 535 is coupled to the microphone 220. The separator circuit 500 is further coupled to the amplifiers 530a and 530b, the digital potentiometer 535 and the storage 590.

During normal operation (i.e., the "audio mode"), the headset 2500 is coupled by the audio-low conductor 191, the audio-high conductors 192a-b, the mic-low conductor 291 and the mic-high conductor 292 to an intercom system or two-way radio (not shown) through which a user of the headset 2500 engages in two-way voice communications with another person. In the audio mode, analog audio signals conveying two audio channels of sounds to be acoustically output to the user by the acoustic drivers 1000a and 1000b are received by the headset 2500 through the audio-high conductors 192a and 192b, respectively, with the audio-low conductor 191 serving as a common return current path for these analog audio signals. Further, in the audio mode, analog audio signals representing sounds detected by the microphone 220 are output by the headset 2500 through the mic-low conductor 291 and the mic-high conductor 292. It should be noted that as depicted, the microphone 220 is a dynamic microphone, but as those skilled in the art will readily recognize, the microphone 220 may be an electret microphone in other possible embodiments.

As those skilled in the common practices of the design of two-way communications headsets will readily recognize, the audio-low and mic-low conductors are usually coupled together to a common ground within the intercom system or two-way radio to which the headset 2500 is coupled, and therefore, it is usually deemed undesirable to also couple these two conductors together within a headset, since doing so is likely cause a ground loop to be formed. Thus, during normal operation in audio mode, the audio-low conductor 191 and the mic-low conductor 291 are normally at (or close to) the same voltage level, despite not being coupled within the headset. And therefore, during audio mode, the separator circuit 500 is not provided with power via these two conductors, and in order to maintain the desired separation between these two conductors, the separator circuit maintains a very high impedance (preferably at several mega-ohms) between these two conductors.

However, at other times during which the headset 2500 is not being operated in its audio mode, the headset 2500 is provided (by whatever device to which the headset 2500 is coupled) with a DC bias voltage across the audio-low conductor 191 and the mic-low conductor 291. This provides the separator circuit 500 is with power through these two conductors and serves to enable a "data mode" in which the headset 2500 is able to exchange digitally-encoded data with whatever device it is coupled to it through these two conductors of separate sets of audio signal conductors. In other words, the audio-low conductor 191 and the mic-low conductor 291 are operated together as a pair to form digital serial bus to exchange digitally-encoded data. In some embodiments, the separator circuit 500 may incorporate a Zener diode to distinguish the DC bias voltage provided to enable the data mode from random voltage potentials across these two conductors that may arise as a result of these two conductors not being directly coupled within the headset 2500.

While in the data mode, the storage 590 may be accessed to store or retrieve data, including data concerning characteristics of one or more of the microphone 220 and the acoustic drivers 1000a and 1000b. Alternatively and/or additionally, a history of repairs and/or refurbishing, replacements of one or more of the microphone 220 and the acoustic drivers 1000a or 1000b (and/or of other components), etc., may be stored, thereby enabling future decisions regarding repair or replacement to be made with knowledge of the past, especially if there are suspicions of a recurring failure that is difficult to verify (data representing a note could be stored describing an aspect of a suspected mode of failure for future reference). Again, this enables replacement of one or more of these electro-acoustic transducers with others having similar characteristics by providing data concerning those characteristics to speed the process of selecting replacement electro-acoustic transducers with similar characteristics. In embodiments in which the amplifiers 530a and 530b are present (rather than in embodiments where the audio-high conductors 192a and 192b are more directly coupled to the acoustic drivers 1000a and 1000b), the data mode may enable the gains of the amplifiers 530a and 530b to be adjusted (such that they are able to serve as gain control components), perhaps to accommodate differences in acoustic output levels of the acoustic drivers 1000a and 1000b from a desired ideal output level or from each other. Similarly, in embodiments in which the digital potentiometer 535 is present, the data mode may enable the resistance through the digital potentiometer 535 to be adjusted as a gain control component able to compensate for variances of the sensitivity (or other characteristics) of the microphone 220 from a desired ideal.

Figure 5A:
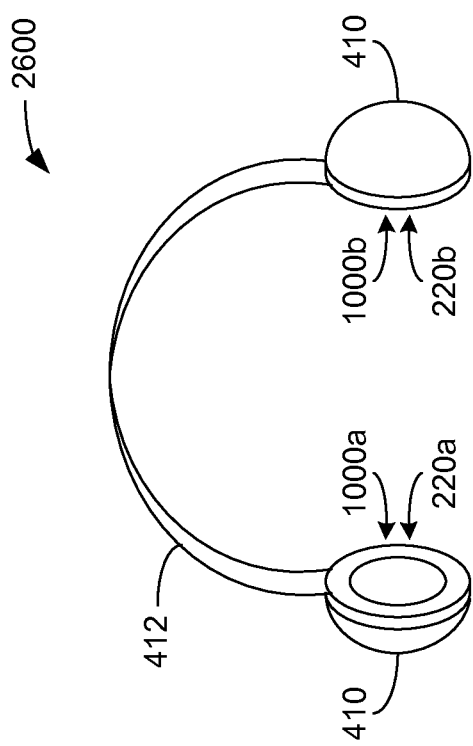
FIG. 5a is a perspective view of a pair of ANR headphones.
Figure 5B:
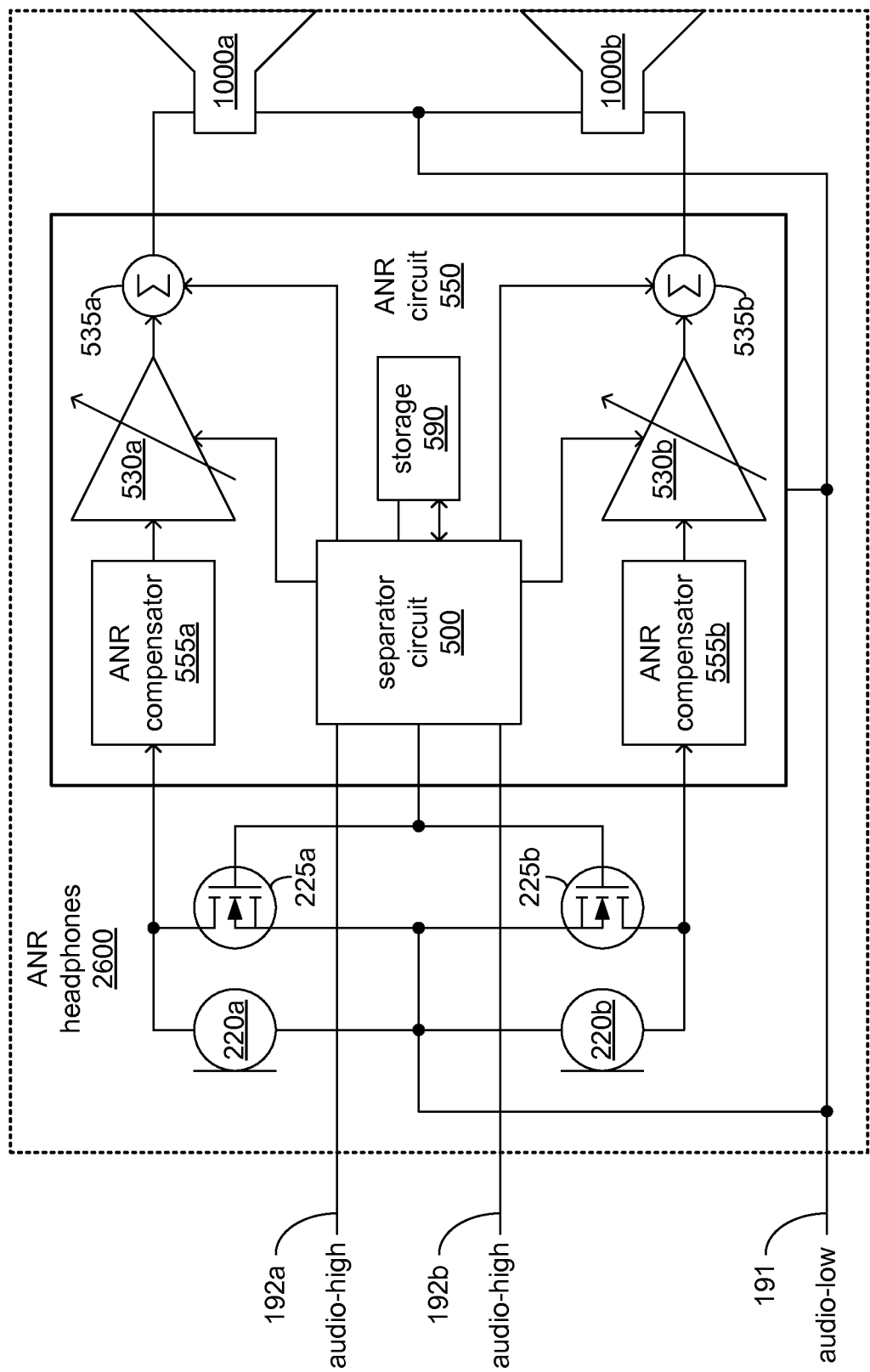
FIG. 5b is a block diagram of the pair of ANR headphones of FIG. 5a depicting a storage for data transferred via audio signal conductors of the pair of ANR headphones and/or gain control components tunable with data transferred via those audio signal conductors.

FIG. 5a is a perspective view of a pair of ANR headphones 2600, and FIG. 5b is a block diagram of the pair of ANR headphones 2600. In a manner that will be familiar to those skilled in the art, the pair of ANR headphones 2600 employs a pair of microphones 220a and 220b (one within each of a pair of earpieces 410) to detect undesired noise sounds, and employs a pair of acoustic drivers 1000*a* and 1000*b* (one within each of a pair of earpieces 410) to acoustically output sounds derived from the noise sounds detected by the pair of microphones 220*a* and 220*b* to reduce the acoustic strength of those noise sounds as perceived by a user of the pair of ANR headphones 2600. In addition to providing ANR, the pair of ANR headphones 2600 also receives analog signals representing audio from an audio source device (not shown) to also be acoustically output by the acoustic drivers 1000*a* and 1000*b* (e.g., music, a recording of a lecture, etc.) through a trio of audio signal conductors. Regarding its physical configuration, the headset 2500 incorporates a pair of earpieces 410 incorporating one each of the acoustic drivers 1000*a* and 1000*b* along with one each of the microphones 220*a* and 200*b*, and a headband 412 coupling together the pair of earpieces 410. Regarding its electrical architecture, the pair of ANR headphones 2600 incorporates the microphones 220*a* and 220*b*, a pair of MOSFETs 225*a* and 225*b*, an ANR circuit 550 and the acoustic drivers 1000*a* and 1000*b*. The ANR circuit 550, itself, incorporates a separator circuit 500, a pair of amplifiers 530*a* and 530*b*, a pair of summing nodes 535*a* and 535*b*, a pair of ANR compensators 555*a* and 555*b*, and a storage 590. As will be explained in greater detail, the ANR circuit 550 is an audio circuit that manipulates noise sounds by deriving anti-noise sounds from those original noise sounds for acoustic output to acoustically attenuate the original noise sounds.

An audio-low conductor 191 is coupled to each of the microphones 220*a* and 220*b*, the MOSFETs 225*a* and 225*b*, the ANR circuit 550 and the acoustic drivers 1000*a* and 1000*b*. Audio-high conductors 192*a* and 192*b* are coupled to the separator circuit 500 incorporated into the ANR circuit 550, which in turn, is coupled to one of the inputs of each of the summing nodes 535*a* and 535*b*, and in turn, the outputs of the summing nodes are coupled to the acoustic drivers 1000*a* and 1000*b*, respectively. The microphones 220*a* and 220*b* are coupled to the ANR compensators 555*a* and 555*b* (which internally bias the microphones 220*a* and 220*b*), which in turn, are coupled to the inputs of the amplifiers 530*a* and 530*b*, and in turn, the outputs of the amplifiers 530*a* and 530*b* are coupled to other inputs of the summing nodes 535*a* and 535*b*, respectively. Further, the separator circuit 500 is further coupled to the MOSFETs 225*a* and 225*b* (which in turn are coupled to the microphones 220*a* and 220*b*, respectively), the amplifiers 530*a* and 530*b*, and the storage 590.

During normal operation (i.e., the "audio mode"), the microphones 220*a* and 220*b* detect undesired noise sounds in the vicinities of their respective ones of the earpieces 410, and provide signals representing those detected noise sounds to corresponding ones of the ANR compensators 555*a* and 555*b*, respectively. It should be noted, and as those skilled in the art of the provision of acoustic noise reduction (ANR) will readily recognize, in different embodiments, the microphones 220*a* and 220*b* may be disposed about their respective ones of the earpieces 410 to detect noises either within the earpieces 410 (i.e., to implement feedback-based ANR, as depicted in FIG. 5*a*) or about external surfaces of the earpieces 410 (i.e., to implement feedforward-based ANR). Regardless of the exact nature of the ANR being provided, the compensators 555*a* and 555*b* derive anti-noise sounds from the detected noise sounds, and output signals representing those anti-noise sounds to the inputs of the amplifiers 530*a* and 530*b*, respectively. The amplifiers 530*a* and 530*b* amplify the anti-noise sounds, imparting an amount of gain to each, and output the amplified anti-noise sounds to the summing nodes 535*a* and 535*b*, respectively. The summing nodes 535*a* and 535*b* combine the amplified anti-noise sounds with the audio received from an external audio source device to which the pair of ANR headphones 2600 may be coupled through the trio of audio signal conductors (i.e., the audio-low conductor 191 and the audio-high conductors 192*a* and 192*b*) and through the separator circuit 500. The summing nodes 535*a* and 535*b* then convey the combined amplified anti-noise sounds and received audio to the acoustic drivers 1000*a* and 1000*b*, respectively.

However, at other times during which the pair of ANR headphones 2600 is not being operated in its audio mode, the pair of ANR headphones 2600 is provided (by whatever device to which the pair of ANR headphones 2600 is coupled) with a DC bias voltage across the audio-low conductor 191 and one or both of the audio-high conductors 192*a* and 192*b*. This enables one or more forms of a "data mode" in which the pair of ANR headphones 2600 is able to exchange pieces of digitally-encoded data with whatever device it is coupled to through at least two of these three audio signal conductors. In other words, the audio-low conductor 191 and the audio-high conductor 192*a* may be operated together as a pair to form a digital serial bus to exchange digitally-encoded data, and/or the audio-low conductor 191 and the audio-high conductor 192*b* may be operated together as a pair to form a digital serial bus to exchange digitally-encoded data. Indeed, through the separate provision of DC bias voltages across one or both of these two pairs of conductors, different digitally-encoded data and/or different components may be accessed, thereby providing a flexibility in selecting what data is exchanged that is not unlike the flexibility afforded by the use of differing magnitudes of DC bias voltage across a single pair of conductors depicted in FIG. 3*b*. Alternatively, all three of the audio-low conductor 191 and the high conductors 192*a* and 192*b* may be operated together as a trio to form a more capable digital serial bus able to exchange pieces of digitally-encoded data more speedily (than a digital serial bus employing only two audio signal conductors, as previously described) through the use of separate conductors as data and handshake conductors, perhaps in a manner somewhat like the I2C digital serial bus promulgated by NXP of Eindhoven in the Netherlands.

The storage 590 may be accessed to store or retrieve pieces of digitally-encoded data, including data concerning characteristics of one or more of the microphones 220*a* and 220, and/or the acoustic drivers 1000*a* and 1000*b*. Again, this enables replacement of one or more of these electro-acoustic transducers with others having similar characteristics by providing data concerning those characteristics to speed the process of selecting replacement electro-acoustic transducers with similar characteristics. In embodiments in which the amplifiers 530*a* and 530*b* are present (rather than in embodiments where the outputs of the ANR compensators 555*a* and 555*b* are more directly coupled to the summing nodes 535*a* and 535*b*), the amplifiers 530*a* and 530*b* serve as gain control components by providing gains that are able to be adjusted, perhaps to accommodate differences in acoustic output levels of the acoustic drivers 1000*a* and 1000*b* from a desired ideal output level or from each other.

Further, in embodiments in which the MOSFETs 225*a* and 225*b* are present, either a command received by the separator circuit 500 as digitally-encoded data, or the mere presence of a particular magnitude of DC bias voltage across one of the aforedescribed pairs of conductors that may be operated as a digital serial bus may cause the operation of one or both of the MOSFETs 225*a* and 225*b* to bypass the coupling of one or both of the microphones 220*a* and 220*b*, respectively, to the audio-low conductor (presumably serving as a ground). In some variants of such embodiments, the gates of the MOSFETs 225a and/or 225b may be coupled to one of (or separately to both of) the audio-high conductors 192a and 192b through a Zener diode having a threshold voltage chosen to pass through a DC bias voltage of a particular voltage level (or higher) such that the mere presence of that DC bias voltage is enough to operate one or both of the MOSFETs 225a and 225b to bypass one or both of the microphones 220a and 220b. With one or both of the microphones 220a and 220b bypassed in this way, the corresponding one(s) of the ANR compensators 555a and 555b ceases to be provided with an input of detected noise sounds, thereby enabling various tests to be conducted of one or more of the ANR compensators 555a and/or 555b, the amplifiers 530a and/or 530b, the summing nodes 535a and/or 535b, and/or the acoustic drivers 1000a and/or 1000b in isolation from the functionality normally provided by the one or both of the microphones 220a and 220b.

Figure 6A:
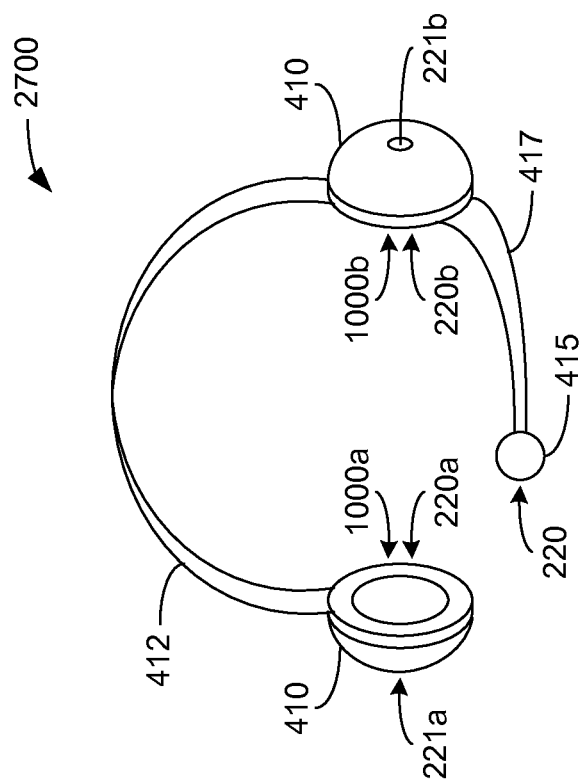
FIG. 6a is a perspective view of a headset providing both two-way communications and ANR.
Figure 6B:
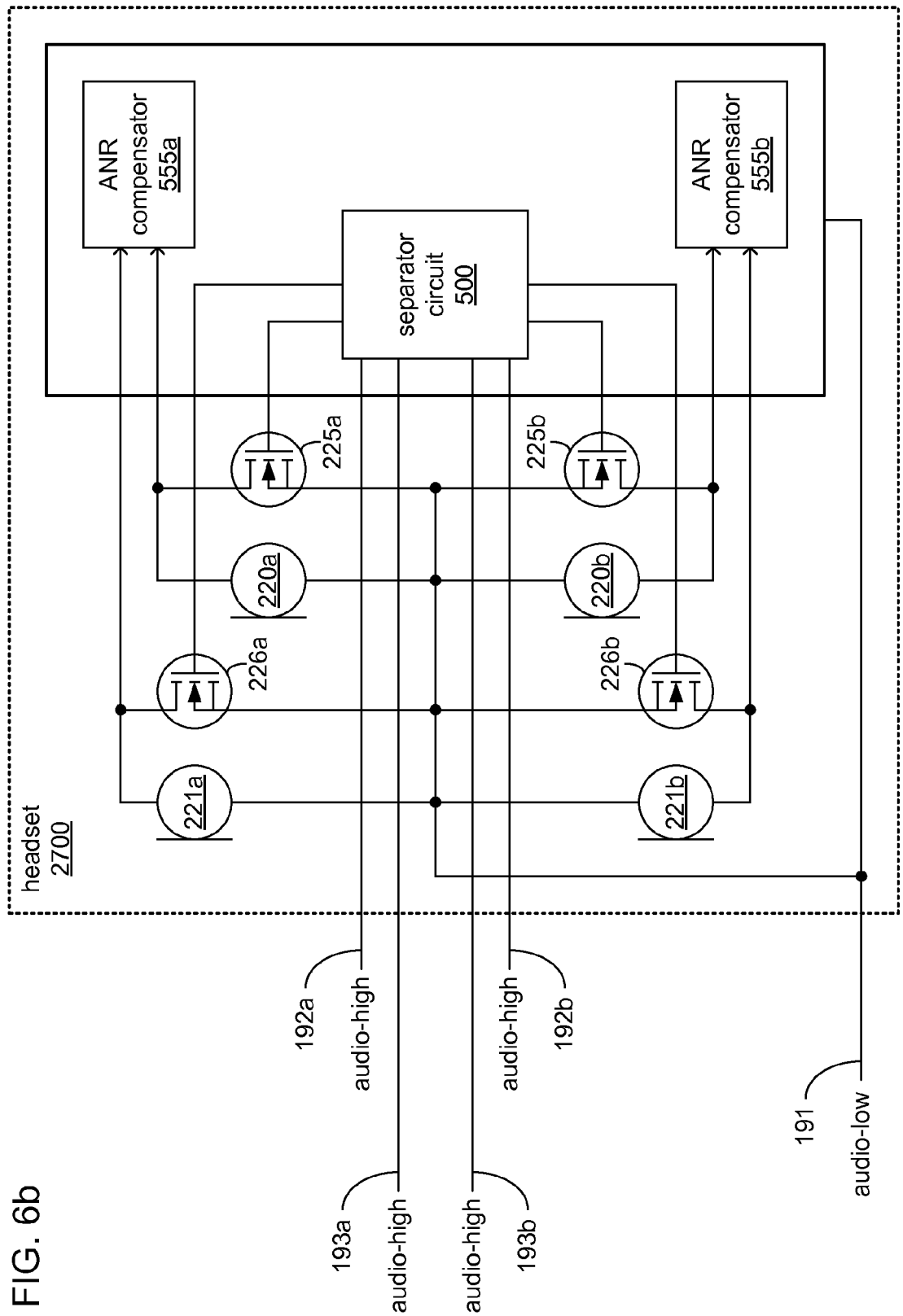
FIG. 6b is a block diagram of a portion of the headset of FIG. 6a depicting the ability of its audio signal conductors to support various tests in addition to data transfers of stored data and/or settings of gain control components.

FIG. 6a is a perspective view of another headset 2700, and FIG. 6b is a block diagram of the headset 2700. The headset 2700 combines the two-way communications feature of the headset 2500 with a provision of both feedback-based and feed-forward based ANR (in contrast to the pair of ANR headphones 2600 providing only one or the other form of ANR). Therefore, the headset 2700 incorporates the earpieces 410, the headband 412, the microphone casing 415 and the microphone boom 417 of both of the headset 2500 and the pair of ANR headphones 2600. The headset 2700 also incorporates the microphones 220, 220a and 220b, along with the acoustic drivers 1000a and 1000b. Further, the headset 2700 additionally incorporates a pair of microphones 221a and 221b (one each separately incorporated into each one of a pair of earpieces 410) to serve as the microphones detecting noise sounds for providing feedforward-based ANR, while the microphones 220a and 200b detect noise sounds for providing feedback-based ANR, and the microphone 220 detects voice sounds in support of two-way communications.

Turning to FIG. 6b, only a portion of the electrical architecture of the headset 2700 (including only a portion of the ANR circuit 550, an audio circuit that manipulates detected noise sounds to produce anti-noise sounds) is depicted for sake of clarity of discussion, and this depicted portion is associated largely with the provision of ANR, and not the supporting of two-way voice communications. It is to be understood that the manner in which two-way communications is supported by the headset 2700 is much the same as was earlier described regarding the headset 2500. As depicted, the headset 2700 incorporates the ANR compensators 555a and 555b also found in the pair of ANR headphones 2600, but in the ANR headset 2700, the ANR compensators 555a and 555b are coupled to the microphones 221a and 221b, respectively, in addition to be coupled to the microphones 220a and 220b, respectively, as part of supporting both feedforward-based and feedback-based ANR. Also as depicted, the headset 2700 incorporates the separator circuit 500 and the MOSFETs 225a and 225b of the pair of ANR headphones 2600, but in the ANR headset 2700, the separator circuit 500 is additionally coupled to a pair of MOSFETs 226a and 226b. Further, the gates of each of these four MOSFETs is separately coupled to the separator circuit 500, whereas the gates of the pair of MOSFETs 225a and 225b of the pair of ANR headphones 2600 were coupled together in a single coupling to the separator circuit 500, thereby necessitating their being operated together.

Thus, a significant difference between the headset 2700 from the pair of ANR headphones 2600, among other significant differences, is the ability to separately operate each of the MOSFETs 225a, 225b, 226a and 226b to separately bypass each of the microphones 220a, 220b, 221a and 221b, respectively, to enable separate tests to be performed of the functionality of each of the acoustic drivers 1000a and 1000b (not specifically shown in FIG. 6b), including the manner in which the acoustic drivers 1000a and 1000b separately interact with different ones of these microphones and/or with corresponding ones of the ANR compensators 555a and 555b. To enable this separate bypassing of these microphones, the headset 2700 provides a pair of sets of audio signal conductors by which the analog audio signals may be provided to the headset 2700, namely one set that includes the pair of audio-high conductors 192a-b and the audio-low conductor 191 also found in the pair of ANR headphones 2600, and another pair of audio-high conductors 193a-b that also employ the audio-low conductor 191 as a return current path. A one-to-one correspondence of each of the audio-high conductors 192a, 192b, 193a and 193b is defined by the separator circuit 500, such that the provision of a relatively high DC bias voltage provided on any one of these four audio signal conductors causes the separator circuit 500 to drive a corresponding one of the MOSFETs 225a, 225b, 226a and 226b to bypass a corresponding one of the microphones 220a, 220b, 221a and 221b.

Although not specifically depicted in FIG. 6b, the portion of the electrical architecture of the headset 2700 involved in driving the acoustic drivers 1000a and 1000b with a combination of ANR anti-noise sounds and sounds received from another device to which the headset 2700 may be coupled is substantially similar to the corresponding portion of the electrical architecture of the pair of ANR headphones 2600. Specifically, the electrical architecture of the headset 2700 also incorporates the summing nodes 535a and 535b by which the analog audio signals provided by another device on the audio-high conductors 192a and 192b are combined with the anti-noise sounds derived by the ANR compensators 555a and 555b, respectively, and analog signal representing the combined sounds of the summing nodes 535a and 535b are provided to the acoustic drivers 1000a and 1000b, respectively. However, the summing nodes 535a and 535b in the electrical architecture of the headset 2700 additionally combine analog audio signals provided on the audio-high conductors 193a and 193b, respectively, with the other analog audio signals that are combined and routed to the acoustic drivers 1000a and 1000b, respectively.

Thus, both the pair of ANR headphones 2600 and the headset 2700 provide the ability to disable the introduction of sounds detected by one or more microphones to enable other portions of their electrical architectures to be tested in isolation with sounds provided on audio signal conductors. By way of example, in the headset 2700, with one or more of the microphones 220a-b and 221a-b bypassed through the provision of a relatively high DC bias voltage on a subset of the audio signal conductors 192a-b and 193a-b, others of the audio signal conductors 192a-b and 193a-b may be employed to provide analog audio signals representing test sounds to be provided to the acoustic drivers 1000a and 1000b to test the operation of at least the acoustic drivers 1000a and/or 1000b. With the results of those tests, a relatively high DC bias voltage may be provided on an appropriate one of the audio signal conductors 192a-b and 193a-b to gain access to and tune one or more gain control components to compensate for variances in one or both of the acoustic drivers 1000a and 1000b.

In this way, either of the pair of ANR headphones 2600 or the headset 2700 can be operated in a "test mode" that is something of a hybrid of the earlier-discussed audio mode and data mode. In this test mode, one subset of the audio signal conductors is provided with a relatively high DC bias voltage to cause the separator circuit 500 to disable one or more of the microphones (through operation of one or more of the MOSFETs) and/or to enable an exchange of a piece of digitally-encoded data through that one subset, while another subset of the audio signal conductors is provided with a relatively low DC bias voltage to cause the separator circuit 500 to also enable an analog audio signal representing a test sound to pass through the separator circuit 500 as part of performing a test. Further a relatively high DC bias voltage on one of the audio signal conductors causing the separator circuit 500 to disable one or more of the microphones may also serve to cause the separator circuit to enable a transfer of digital data entailing use of the very same one of the audio signal conductors. With such flexibility in the use of a relatively high DC bias voltage, exchanges of digitally-encoded data to set a resistance of a digital potentiometer, the gain of an amplifier or to set some other parameter of some other form of gain control component could be done simultaneously with the conduct of a test involving the provision of an analog audio signal, and indeed, the setting provided to a gain control component may be part of performing the test and/or part of using a result of the test as the test occurs. Thus, the separator circuit 500 of the pair of ANR headphones 2600 and the headset 2700 must be sophisticated enough to allow different subsets of audio signal conductors to be used in different ways, simultaneously. It must also be noted that since there is only one of the audio-low conductor 191 available to serve as a ground conductor, the audio-low conductor may be part of more than one of these subsets such that it serves as a current return path for both an exchange of digital data and a conveying of an analog audio signal occurring simultaneously on different ones of the audio-high conductors 192*a*, 192*b*, 193*a* and/or 193*b*.

Other implementations are within the scope of the following claims and other claims to which the applicant may be entitled.

The invention claimed is:
1. An electro-acoustic transducer comprising:
a diaphragm enabling transduction between acoustic energy and electrical energy;
two audio signal conductors to enable coupling of the electro-acoustic transducer to a device; and
a separator circuit coupled to the two audio signal conductors, and structured to:
employ a threshold voltage to distinguish between a relatively low DC bias voltage placed across the two audio signal conductors by the device and a relatively high DC bias voltage placed across the two audio signal conductors by the device;
in response to the relatively low DC bias voltage placed across the two audio signal conductors, allow an analog audio signal representing a sound to be conveyed between the device and the separator circuit through the two audio signal conductors, and allow an AC component of the analog audio signal to pass through the separator circuit to enable transduction between acoustic energy of the sound and electrical energy of the analog audio signal representing the sound; and
in response to the relatively high DC bias voltage across the two audio signal conductors, operate at least the two audio signal conductors as a digital serial bus to enable a piece of digitally-encoded data to be exchanged between the separator circuit and the device through the two audio signal conductors.

2. The electro-acoustic transducer of claim 1, wherein the separator circuit comprises a Zener diode having a threshold voltage that defines the threshold voltage employed by the separator circuit to distinguish between the relatively low and the relatively high DC bias voltages.

3. The electro-acoustic transducer of claim 1, further comprising a storage to store the piece of digitally-encoded data and coupled to the separator circuit to enable the device to access the storage through the two audio signal conductors to retrieve the piece of digitally-encoded data from a storage location of the storage.

4. The electro-acoustic transducer of claim 3, wherein the piece of digitally-encoded data represents data concerning a characteristic of the electro-acoustic transducer, the characteristic being one of a set consisting of: a measured realizable range of frequencies, a measured resistance across a specific range of frequencies, a measured level of sensitivity across a specific range of frequencies, a serial number enabling a measured characteristic of the electro-acoustic transducer to be obtained from a record, an identity of a manufacturer of the electro-acoustic transducer enabling the manufacturer to be contacted to obtain a measured characteristic of the electro-acoustic transducer, a history of repairs, a history of refurbishment, and a note concerning a suspected mode of failure.

5. The electro-acoustic transducer of claim 1, wherein:
the electro-acoustic transducer is an acoustic driver comprising a coil coupled to the diaphragm and to the separator circuit to cooperate with the diaphragm to convert the electrical energy of the analog audio signal representing the sound into the acoustic energy of the sound; and
the separator circuit comprises a capacitor to enable the AC component of the analog audio signal to pass through the separator circuit between one of the two audio signal conductors and the coil, and to disallow passage of DC bias voltages placed across the two audio signal conductors through the coil.

6. The electro-acoustic transducer of claim 5, wherein:
the electro-acoustic transducer further comprises a digital potentiometer interposed between the output of the amplifier and the separator circuit as a gain control component enabling control of a gain of the amplifier to compensate for a characteristic of the electro-acoustic transducer; and
wherein the separator circuit is structured to enable the digital potentiometer to be accessed by the device through the two audio signal conductors to convey the piece of digitally-encoded data to the digital potentiometer to set a level of resistance imposed by the digital potentiometer between the output of the amplifier and the separator circuit to control the gain of the amplifier.

7. The electro-acoustic transducer of claim 1, wherein:
the diaphragm is conductive and is coupled to one of the two audio signal conductors; and
the electro-acoustic transducer is an electret microphone comprising:
an amplifier having an output coupled to the separator circuit; and
a conductive plate coupled to an input of the amplifier and positioned adjacent to the to diaphragm to cooperate with the diaphragm to convert the acoustic energy of the sound into a varying level of capacitance that is amplified by the amplifier to provide the electrical energy of the analog audio signal representing the sound.

8. An apparatus comprising:
an acoustic driver;
two audio signal conductors to enable coupling of the apparatus to a device;
an audio circuit structured to manipulate an analog audio signal representing a sound provided by the device on the two audio signal conductors to derive a derived sound from the sound, and coupled to the acoustic driver to convey a derived analog audio signal representing the derived sound to the acoustic driver; and
a separator circuit coupled to the two audio signal conductors and to the audio circuit, and structured to:
employ a first threshold voltage to distinguish between a relatively low DC bias voltage placed across the two audio signal conductors by the device and a first relatively high DC bias voltage placed across the two audio signal conductors by the device;
in response to the relatively low DC bias voltage placed across the two audio signal conductors, allow the analog audio signal to be conveyed through the separator circuit from the two audio signal conductors to the audio circuit; and
in response to the first relatively high DC bias voltage across the two audio signal conductors, operate at least the two audio signal conductors as a digital serial bus to enable a first piece of digitally-encoded data to be exchanged between the separator circuit and the device through the two audio signal conductors.

9. The apparatus of claim 8, wherein the separator circuit comprises a Zener diode having a threshold voltage that defines the first threshold voltage employed by the separator circuit to distinguish between the relatively low and the first relatively high DC bias voltages.

10. The apparatus of claim 8, further comprising a storage to store the first piece of digitally-encoded data and coupled to the separator circuit to enable the device to access the storage through the two audio signal conductors to retrieve the first piece of digitally-encoded data from a storage location of the storage.

11. The electro-acoustic transducer of claim 10, wherein the first piece of digitally-encoded data represents data concerning a characteristic of the electro-acoustic transducer, the characteristic being one of a set consisting of: a measured realizable range of frequencies, a measured resistance across a specific range of frequencies, a measured level of sensitivity across a specific range of frequencies, a serial number enabling a measured characteristic of the electro-acoustic transducer to be obtained from a record, an identity of a manufacturer of the electro-acoustic transducer enabling the manufacturer to be contacted to obtain a measured characteristic of the electro-acoustic transducer, a history of repairs, a history of refurbishment, and a note concerning a suspected mode of failure.

12. The apparatus of claim 8 further comprising a gain control component operable to control a gain of the audio circuit to compensate for a characteristic of the acoustic driver in response to being accessed and set with the first piece of digitally-encoded data through the two audio signal conductors by the device, wherein the first piece of digitally-encoded data represents a setting for the gain control component.

13. The apparatus of claim 12, wherein the gain control component is a digital potentiometer, and the first piece of digitally-encoded data represents a resistance setting.

14. The apparatus of claim 12, wherein the gain control component is an amplifier, and the first piece of digitally-encoded data represents a gain setting.

15. The apparatus of claim 8, further comprising:
a microphone; and
a gain control component operable to control a gain of the audio circuit to compensate for a characteristic of the microphone in response to being accessed and set with the first piece of digitally-encoded data through the two audio signal conductors by the device, wherein the first piece of digitally-encoded data represents a setting for the gain control component.

16. The apparatus of claim 8, wherein the separator circuit is further structured to:
employ a second threshold voltage to distinguish between the first relatively high DC bias voltage and a second relatively high DC bias voltage; and
in response to the second relatively high DC bias voltage across the two audio signal conductors, operate at least the two audio signal conductors as a digital serial bus to enable a second piece of digitally-encoded data to be exchanged between the separator circuit and the device through the two audio signal conductors.

17. The apparatus of claim 16, wherein the second relatively high DC bias voltage has a similar polarity to the first relatively high DC bias voltage across the two audio signal conductors and has a greater magnitude of voltage level than the first relatively high DC bias voltage.

18. The apparatus of claim 16, wherein the second relatively high DC bias voltage has a polarity across the two audio signal conductors that is opposite to a polarity of the first relatively high DC bias voltage across the two audio signal conductors.

19. The apparatus of claim 16, wherein the separator circuit is further structured to:
enable access to a first component of the apparatus by the device through the two audio signal conductors to enable an exchange of the first piece of digitally-encoded data between the device and the first component through the separator circuit in response to the first relatively high DC bias voltage across the two audio signal conductors; and
enable access to a second component of the apparatus by the device through the two audio signal conductors to enable an exchange of the second piece of digitally-encoded data between the device and the second component through the separator circuit in response to the second relatively high DC bias voltage across the two audio signal conductors.

20. The apparatus of claim 16, wherein the separator circuit is further structured to:
enable access to a first storage location of a storage off the apparatus by the device through the two audio signal conductors to enable an exchange of the first piece of digitally-encoded data between the device and the first storage location of the storage through the separator circuit in response to the first relatively high DC bias voltage across the two audio signal conductors; and
enable access to a second storage location of the storage by the device through the two audio signal conductors to enable an exchange of the second piece of digitally-encoded data between the device and the second storage location of the storage through the separator circuit in response to the second relatively high DC bias voltage across the two audio signal conductors.

21. The apparatus of claim 8, further comprising a third audio signal conductor, wherein the separator circuit is further structured to:
distinguish a second relatively high DC bias threshold voltage across the third audio signal conductor and one of the two audio signal conductors from the first relatively high DC bias threshold across the pair of audio signal conductors; and in response to the second relatively high DC bias voltage across the third audio signal conductor and the one of the two audio signal conductors, operate the third audio signal conductor and the one of the two audio signal conductors as another digital serial bus to enable a second piece of digitally-encoded data to be exchanged between the separator circuit and the device.

22. The apparatus of claim 8, further comprising a third audio signal conductor, wherein operating at least the two audio signal conductors as a digital serial bus to enable a first piece of digitally-encoded data to be exchanged between the separator circuit and the device through the two audio signal conductors comprises additionally operating the third audio signal conductor with the two audio signal conductors as the digital serial bus to enable the first piece of digitally-encoded data to be exchanged between the separator circuit and the device through third audio signal conductor and the two audio signal conductors.

23. The apparatus of claim 8, wherein:
the apparatus is a speaker;
the audio circuit is a crossover;
the apparatus further comprises another acoustic driver coupled to the audio circuit; and
the audio circuit is structured to derive another derived sound from the sound and to provide another derived analog audio signal representing the another derived sound to the another acoustic driver.

24. The apparatus of claim 8, wherein:
the apparatus provides ANR;
the audio circuit comprises an ANR compensator;
the apparatus further comprises a microphone coupled to the audio circuit; and
the audio circuit is structured to derive anti-noise sounds as the derived sound.

\* \* \* \* \*